(12) United States Patent
Sawicki et al.

(10) Patent No.: US 7,716,676 B2
(45) Date of Patent: May 11, 2010

(54) SYSTEM AND METHOD FOR ISSUING A MESSAGE TO A PROGRAM

(75) Inventors: Marcin Sawicki, Kirkland, WA (US); Brian M. Jones, Redmond, WA (US); Jeffrey C. Reynar, Woodinville, WA (US); Edward W. Tharp, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 653 days.

(21) Appl. No.: 10/183,317

(22) Filed: Jun. 25, 2002

(65) Prior Publication Data

US 2003/0237049 A1    Dec. 25, 2003

(51) Int. Cl.
  G06F 9/54    (2006.01)
  G06F 17/00    (2006.01)

(52) U.S. Cl. ............... 719/313; 719/318; 715/234; 715/235; 715/237

(58) Field of Classification Search .......... 719/313, 719/318; 715/234, 235, 237, 530, 513
See application file for complete search history.

(56) References Cited

U.S. PATENT DOCUMENTS

| | | | |
|---|---|---|---|
| 4,674,065 A | 6/1987 | Lange et al. | 382/311 |
| 4,868,750 A | 9/1989 | Kucera et al. | 711/2 |
| 5,020,019 A | 5/1991 | Ogawa | 707/5 |
| 5,128,865 A | 7/1992 | Sadler | 704/2 |
| 5,159,552 A | 10/1992 | van Gasteren et al. | 704/1 |
| 5,267,155 A | 11/1993 | Buchanan et al. | 715/540 |
| 5,287,448 A | 2/1994 | Nicol et al. | 715/707 |
| 5,297,039 A | 3/1994 | Kanaegami et al. | 707/5 |
| 5,317,546 A | 5/1994 | Balch et al. | 368/9 |
| 5,337,233 A | 8/1994 | Hofert et al. | 715/540 |
| 5,341,293 A | 8/1994 | Vertelney et al. | 715/530 |
| 5,351,190 A | 9/1994 | Kondo | 704/8 |
| 5,386,564 A | 1/1995 | Shearer et al. | 395/650 |
| 5,392,386 A | 2/1995 | Chalas | 715/841 |

(Continued)

FOREIGN PATENT DOCUMENTS

CA    2 2476 920 A1    3/2000

(Continued)

OTHER PUBLICATIONS

European Communication dated Sep. 25, 2007 cited in European Application No. 03 014 181.6-1243.

(Continued)

*Primary Examiner*—Li B Zhen
(74) *Attorney, Agent, or Firm*—Merchant & Gould

(57) ABSTRACT

Described is a mechanism for issuing an event notification message, from a first program to a second program, to indicate that an action occurred within the first program, where the event notification message includes a parameter that indicates that the action is one of a group of possible actions. More specifically, in an application configured to edit documents created with the eXtensible Markup Language XML, the occurrence of an XML-related action causes the event notification message to be issued. The XML-related action may be either an XML-related move action, an XML-related insert action, or an XML-related delete action. In this way, a single event notification message can be used to indicate the occurrence of three different types of actions while editing an XML document.

23 Claims, 6 Drawing Sheets

U.S. PATENT DOCUMENTS

| | | | |
|---|---|---|---|
| 5,418,902 A | 5/1995 | West et al. | 715/503 |
| 5,446,891 A | 8/1995 | Kaplan et al. | 395/600 |
| 5,522,089 A | 5/1996 | Kikinis et al. | 710/73 |
| 5,535,323 A | 7/1996 | Miller et al. | 715/707 |
| 5,541,836 A | 7/1996 | Church et al. | 704/7 |
| 5,546,521 A | 8/1996 | Martinez | 715/711 |
| 5,581,684 A | 12/1996 | Dudzik et al. | 715/708 |
| 5,596,700 A | 1/1997 | Darnell et al. | 715/512 |
| 5,617,565 A | 4/1997 | Augenbraun et al. | 395/604 |
| 5,625,783 A | 4/1997 | Ezekiel et al. | 395/352 |
| 5,627,567 A | 5/1997 | Davidson | 345/173 |
| 5,627,958 A | 5/1997 | Potts et al. | 715/708 |
| 5,634,019 A | 5/1997 | Koppolu et al. | 715/744 |
| 5,640,560 A | 6/1997 | Smith | 395/615 |
| 5,657,259 A | 8/1997 | Davis et al. | 708/204 |
| 5,685,000 A | 11/1997 | Cox | 704/9 |
| 5,708,825 A | 1/1998 | Sotomayor | 395/762 |
| 5,715,415 A | 2/1998 | Dazey et al. | 715/708 |
| 5,717,923 A | 2/1998 | Dedrick | 395/613 |
| 5,752,022 A | 5/1998 | Chiu et al. | 395/610 |
| 5,761,689 A | 6/1998 | Rayson et al. | 707/533 |
| 5,764,794 A | 6/1998 | Perlin | 382/186 |
| 5,765,156 A | 6/1998 | Guzak et al. | 707/100 |
| 5,781,189 A | 7/1998 | Holleran et al. | 715/826 |
| 5,781,904 A | 7/1998 | Oren et al. | 707/100 |
| 5,794,257 A | 8/1998 | Liu et al. | 707/501 |
| 5,799,068 A | 8/1998 | Kikinis et al. | 379/93.06 |
| 5,802,253 A | 9/1998 | Gross et al. | 395/51 |
| 5,802,262 A | 9/1998 | Van De Vanter | 395/180 |
| 5,802,299 A | 9/1998 | Logan et al. | 395/200.48 |
| 5,802,530 A | 9/1998 | van Hoff | 707/513 |
| 5,805,911 A | 9/1998 | Miller | 395/796 |
| 5,809,318 A | 9/1998 | Rivette et al. | 715/512 |
| 5,815,830 A | 9/1998 | Anthony | 707/6 |
| 5,818,447 A | 10/1998 | Wolf et al. | 715/752 |
| 5,821,931 A | 10/1998 | Berquist et al. | 715/784 |
| 5,822,539 A | 10/1998 | van Hoff | 395/200.66 |
| 5,822,720 A | 10/1998 | Bookman et al. | 704/3 |
| 5,826,025 A | 10/1998 | Gramlich | 395/200.47 |
| 5,832,100 A | 11/1998 | Lawton et al. | 382/100 |
| 5,845,077 A | 12/1998 | Fawcett | 709/221 |
| 5,855,007 A | 12/1998 | Jovicic et al. | 705/14 |
| 5,859,636 A | 1/1999 | Pandit | 715/501.1 |
| 5,872,973 A | 2/1999 | Mitchell et al. | 395/685 |
| 5,875,443 A | 2/1999 | Nielsen | 707/2 |
| 5,877,757 A | 3/1999 | Baldwin et al. | 715/705 |
| 5,884,266 A | 3/1999 | Dvorak | 704/270.1 |
| 5,892,919 A | 4/1999 | Nielsen | 395/200.58 |
| 5,893,073 A | 4/1999 | Kasso et al. | 705/8 |
| 5,893,132 A | 4/1999 | Huffman et al. | 715/201 |
| 5,895,461 A | 4/1999 | De La Huerga et al. | 707/1 |
| 5,896,321 A | 4/1999 | Miller et al. | 365/189.01 |
| 5,900,004 A | 5/1999 | Gipson | 707/530 |
| 5,907,852 A | 5/1999 | Yamada | 715/541 |
| 5,913,214 A | 6/1999 | Madnick et al. | 707/10 |
| 5,920,859 A | 7/1999 | Li | 707/5 |
| 5,924,099 A | 7/1999 | Guzak et al. | 707/100 |
| 5,933,139 A | 8/1999 | Feigner et al. | 715/708 |
| 5,933,140 A | 8/1999 | Strahorn et al. | 715/712 |
| 5,933,498 A | 8/1999 | Schneck et al. | 705/54 |
| 5,940,614 A | 8/1999 | Allen et al. | 717/120 |
| 5,944,787 A | 8/1999 | Zoken | 709/206 |
| 5,946,647 A | 8/1999 | Miller et al. | 704/9 |
| 5,948,061 A | 9/1999 | Merriman et al. | 709/219 |
| 5,956,681 A | 9/1999 | Yamakita | 704/260 |
| 5,974,413 A | 10/1999 | Beauregard et al. | 707/6 |
| 5,987,480 A | 11/1999 | Donohue et al. | 715/501.1 |
| 5,991,719 A | 11/1999 | Yazaki et al. | 704/251 |
| 5,995,756 A | 11/1999 | Hermann | 395/712 |
| 6,006,265 A | 12/1999 | Rangan et al. | 709/226 |
| 6,006,279 A | 12/1999 | Hayes | 719/328 |
| 6,014,616 A | 1/2000 | Kim | 704/8 |
| 6,018,761 A | 1/2000 | Uomini | 706/206 |
| 6,028,605 A | 2/2000 | Conrad et al. | 345/840 |
| 6,029,135 A | 2/2000 | Krasle | 704/275 |
| 6,029,171 A | 2/2000 | Smiga et al. | 707/102 |
| 6,031,525 A | 2/2000 | Perlin | 345/173 |
| 6,052,531 A | 4/2000 | Waldin et al. | 717/170 |
| 6,061,516 A | 5/2000 | Yoshikawa et al. | 717/109 |
| 6,067,087 A | 5/2000 | Krauss et al. | 715/762 |
| 6,072,475 A | 6/2000 | van Ketwich | 345/173 |
| 6,073,090 A | 6/2000 | Fortune et al. | 704/8 |
| 6,085,201 A | 7/2000 | Tso | 715/505 |
| 6,088,711 A | 7/2000 | Fein et al. | 715/523 |
| 6,092,074 A | 7/2000 | Rodkin et al. | 707/102 |
| 6,108,640 A | 8/2000 | Slotznick | 705/26 |
| 6,108,674 A | 8/2000 | Murakami et al. | 715/515 |
| 6,112,209 A | 8/2000 | Gusack | 707/101 |
| 6,441,753 B1 | 8/2000 | Montgomery | 341/34 |
| 6,121,968 A | 9/2000 | Arcuri et al. | 345/352 |
| 6,122,647 A | 9/2000 | Horowitz et al. | 707/513 |
| 6,126,306 A | 10/2000 | Ando | 708/605 |
| 6,137,911 A | 10/2000 | Zhilyaev | 382/225 |
| 6,141,005 A | 10/2000 | Hetherington et al. | 715/866 |
| 6,151,643 A | 11/2000 | Cheng et al. | 710/36 |
| 6,154,738 A | 11/2000 | Call | 707/4 |
| 6,167,469 A | 12/2000 | Safai et al. | 710/62 |
| 6,167,523 A | 12/2000 | Strong | 726/21 |
| 6,167,568 A | 12/2000 | Gandel et al. | 717/176 |
| 6,173,316 B1 | 1/2001 | De Boor et al. | 709/218 |
| 6,182,029 B1 | 1/2001 | Friedman | 704/9 |
| 6,185,550 B1 | 2/2001 | Snow et al. | 707/1 |
| 6,185,576 B1 | 2/2001 | McIntosh | 707/200 |
| 6,199,046 B1 | 3/2001 | Heinzle et al. | 705/1 |
| 6,199,081 B1 | 3/2001 | Meyerzon et al. | 715/513 |
| 6,208,338 B1 | 3/2001 | Fischer et al. | 715/705 |
| 6,219,698 B1 | 4/2001 | Iannucci et al. | 709/221 |
| 6,246,404 B1 | 6/2001 | Feigner et al. | 715/708 |
| 6,262,728 B1 | 7/2001 | Alexander | 345/440.1 |
| 6,272,074 B1 | 8/2001 | Winner | 368/10 |
| 6,272,505 B1 | 8/2001 | De La Huerga | 707/501 |
| 6,282,489 B1 | 8/2001 | Bellesfield et al. | 701/201 |
| 6,291,785 B1 | 9/2001 | Koga et al. | 209/584 |
| 6,292,768 B1 | 9/2001 | Chan | 704/1 |
| 6,295,061 B1 | 9/2001 | Park et al. | 715/764 |
| 6,297,822 B1 | 10/2001 | Feldman | 715/705 |
| 6,300,950 B1 | 10/2001 | Clark et al. | 715/705 |
| 6,308,171 B1 | 10/2001 | De La Huerga | 707/3 |
| 6,311,152 B1 | 10/2001 | Bai et al. | 704/9 |
| 6,311,177 B1 | 10/2001 | Dauerer et al. | 707/2 |
| 6,311,194 B1 | 10/2001 | Sheth et al. | 715/505 |
| 6,320,496 B1 | 11/2001 | Sokoler et al. | 340/470.1 |
| 6,323,853 B1 | 11/2001 | Hedloy | 345/339 |
| 6,336,125 B2 | 1/2002 | Noda et al. | 715/531 |
| 6,336,131 B1 | 1/2002 | Wolfe et al. | 709/203 |
| 6,338,059 B1 | 1/2002 | Fields et al. | 707/4 |
| 6,339,436 B1 | 1/2002 | Amro et al. | 715/714 |
| 6,339,755 B1 | 1/2002 | Hetherington et al. | 704/8 |
| 6,347,398 B1 | 2/2002 | Parthasarathy et al. | 717/170 |
| 6,349,295 B1 | 2/2002 | Tedesco et al. | 707/3 |
| 6,353,926 B1 | 3/2002 | Parthesarathy et al. | 717/11 |
| 6,381,742 B2 | 4/2002 | Forbes et al. | 717/176 |
| 6,382,350 B1 | 5/2002 | Jezewski et al. | 181/290 |
| 6,392,668 B1 | 5/2002 | Murray | 715/38 |
| 6,396,515 B1 | 5/2002 | Hetherington et al. | 715/762 |
| 6,401,067 B2 | 6/2002 | Lewis et al. | 704/275 |
| 6,408,323 B1 | 6/2002 | Kobayashi et al. | 709/100 |
| 6,413,100 B1 | 7/2002 | Dickmeyer et al. | 434/322 |
| 6,415,304 B1 | 7/2002 | Horvitz | 715/205 |
| 6,421,678 B2 | 7/2002 | Smiga et al. | 707/102 |
| 6,424,979 B1 | 7/2002 | Livingston et al. | 715/511 |
| 6,434,567 B1 | 8/2002 | De La Huerga | 707/102 |
| 6,438,545 B1 | 8/2002 | Beauregard et al. | 707/6 |
| 6,442,545 B1 | 8/2002 | Feldman et al. | 707/8 |

| | | | | | | | |
|---|---|---|---|---|---|---|---|
| 6,442,591 | B1 | 8/2002 | Haynes et al. ............... 709/206 | 6,964,010 | B1 | 11/2005 | Sharp ......................... 715/507 |
| 6,456,304 | B1 | 9/2002 | Anguilo et al. ............. 715/779 | 6,975,983 | B1 | 12/2005 | Fortescue et al. ............. 704/9 |
| 6,470,091 | B2 | 10/2002 | Koga et al. ................. 382/101 | 6,976,090 | B2 | 12/2005 | Ben-Shaul et al. .......... 709/246 |
| 6,473,069 | B1 | 10/2002 | Gerpheide .................. 345/157 | 6,976,209 | B1 | 12/2005 | Storisteanu et al. ......... 715/512 |
| 6,493,006 | B1 | 10/2002 | Gourdol et al. ............. 345/825 | 6,981,212 | B1 * | 12/2005 | Claussen et al. ............. 715/205 |
| 6,477,510 | B1 | 11/2002 | Johnson ....................... 705/30 | 6,986,104 | B2 | 1/2006 | Green et al. ................ 715/523 |
| 6,480,860 | B1 | 11/2002 | Monday ..................... 707/102 | 6,990,654 | B2 | 1/2006 | Carroll, Jr. ................... 717/109 |
| 6,498,982 | B2 | 12/2002 | Bellesfield et al. .......... 701/202 | 7,003,522 | B1 | 2/2006 | Reynar et al. ................ 707/10 |
| 6,510,504 | B2 | 1/2003 | Satyanarayanan ........... 711/170 | 7,013,289 | B2 | 3/2006 | Horn et al. .................... 705/26 |
| 6,516,321 | B1 | 2/2003 | De La Huerga ............. 707/102 | 7,024,658 | B1 | 4/2006 | Cohen et al. ................. 717/117 |
| 6,519,557 | B1 | 2/2003 | Emens et al. ................. 704/8 | 7,028,312 | B1 | 4/2006 | Merrick et al. .............. 719/330 |
| 6,519,603 | B1 | 2/2003 | Bays et al. .................. 707/102 | 7,032,174 | B2 | 4/2006 | Montero et al. ............. 715/257 |
| 6,546,433 | B1 | 4/2003 | Matheson ................... 709/318 | 7,039,859 | B1 | 5/2006 | Sundaresan ................. 715/229 |
| 6,553,385 | B2 | 4/2003 | Johnson et al. .......... 707/104.1 | 7,051,076 | B2 | 5/2006 | Tsuchiya .................... 709/206 |
| 6,556,972 | B1 | 4/2003 | Bakis et al. ................. 704/277 | 7,082,392 | B1 | 7/2006 | Butler et al. ................. 704/233 |
| 6,556,984 | B1 | 4/2003 | Zien ................................ 707/2 | 7,100,115 | B1 | 8/2006 | Yennaco ...................... 715/748 |
| 6,564,264 | B1 | 5/2003 | Creswell et al. ............. 709/245 | 7,113,976 | B2 | 9/2006 | Watanabe .................... 709/206 |
| 6,571,241 | B1 | 5/2003 | Nosohara ....................... 707/6 | 7,146,564 | B2 | 12/2006 | Kim et al. .................... 715/235 |
| 6,571,253 | B1 | 5/2003 | Thompson et al. ....... 707/103 R | 7,216,351 | B1 | 5/2007 | Maes ........................... 719/328 |
| 6,591,260 | B1 | 7/2003 | Schwarzhoff et al. .......... 707/2 | 7,237,190 | B2 | 6/2007 | Rollins et al. ................ 715/234 |
| 6,595,342 | B1 | 7/2003 | Maritzen et al. ............. 194/212 | 7,281,245 | B2 | 10/2007 | Reynar et al. ................ 717/173 |
| 6,601,075 | B1 | 7/2003 | Huang et al. ............. 707/104.1 | 7,302,634 | B2 | 11/2007 | Lucovsky et al. ............ 715/200 |
| 6,604,099 | B1 | 8/2003 | Chung et al. ................... 707/3 | 7,305,354 | B2 | 12/2007 | Rodriguez et al. ........... 705/26 |
| 6,615,131 | B1 | 9/2003 | Rennard et al. ............. 701/200 | 7,392,479 | B2 | 6/2008 | Jones et al. .................. 715/513 |
| 6,618,733 | B1 | 9/2003 | White et al. ................. 707/103 | 7,421,645 | B2 | 9/2008 | Reynar ........................ 715/206 |
| 6,622,140 | B1 | 9/2003 | Kantrowitz ..................... 707/5 | 7,454,459 | B1 | 11/2008 | Kapoor et al. ............... 709/203 |
| 6,623,527 | B1 | 9/2003 | Hamzy ....................... 715/513 | 2001/0029605 | A1 | 10/2001 | Forbes et al. .................. 717/11 |
| 6,625,581 | B1 | 9/2003 | Perkowski ................... 705/27 | 2001/0041328 | A1 | 11/2001 | Fisher ......................... 434/157 |
| 6,629,079 | B1 | 9/2003 | Spiegel et al. ................ 705/26 | 2001/0042098 | A1 | 11/2001 | Gupta et al. ................. 709/206 |
| 6,631,519 | B1 | 10/2003 | Nicholson et al. ........... 717/169 | 2001/0049702 | A1 | 12/2001 | Najmi ......................... 707/513 |
| 6,636,880 | B1 | 10/2003 | Bera ........................... 708/206 | 2001/0056461 | A1 | 12/2001 | Kampe et al. ............... 709/201 |
| 6,643,650 | B1 | 11/2003 | Slaughter et al. ............. 707/10 | 2002/0002590 | A1 | 1/2002 | King et al. .................. 709/206 |
| 6,654,734 | B1 | 11/2003 | Mani et al. ..................... 707/2 | 2002/0003469 | A1 | 1/2002 | Gupta ...................... 340/407.1 |
| 6,654,932 | B1 | 11/2003 | Bahrs et al. ................. 715/507 | 2002/0003898 | A1 | 1/2002 | Wu .............................. 382/187 |
| 6,658,623 | B1 | 12/2003 | Schilit et al. ................ 715/513 | 2002/0004803 | A1 | 1/2002 | Serebrennikov ............. 715/513 |
| 6,687,485 | B2 | 2/2004 | Hopkins et al. ............. 434/350 | 2002/0007309 | A1 | 1/2002 | Reynar ......................... 705/14 |
| 6,694,307 | B2 | 2/2004 | Julien ............................. 707/3 | 2002/0023113 | A1 | 2/2002 | Hsing et al. ................. 707/513 |
| 6,697,824 | B1 | 2/2004 | Bowman-Amuah ......... 709/229 | 2002/0023136 | A1 | 2/2002 | Silver et al. ................. 709/206 |
| 6,697,837 | B1 | 2/2004 | Rodov ......................... 709/203 | 2002/0026450 | A1 | 2/2002 | Kuramochi ............... 707/104.1 |
| 6,708,189 | B1 | 3/2004 | Fitzsimons et al. .......... 707/205 | 2002/0029304 | A1 | 3/2002 | Reynar et al. ............... 709/332 |
| 6,715,144 | B2 | 3/2004 | Daynes et al. ............... 717/174 | 2002/0035581 | A1 | 3/2002 | Reynar et al. ............... 715/513 |
| 6,717,593 | B1 | 4/2004 | Jennings ..................... 715/760 | 2002/0038180 | A1 | 3/2002 | Bellesfield et al. .......... 701/202 |
| 6,718,516 | B1 | 4/2004 | Claussen et al. ............. 715/513 | 2002/0065110 | A1 | 5/2002 | Enns et al. ................... 455/566 |
| 6,728,679 | B1 | 4/2004 | Strubbe et al. ............ 704/270.1 | 2002/0065651 | A1 | 5/2002 | Malik .......................... 709/206 |
| 6,732,090 | B2 | 5/2004 | Shanahan et al. ............... 707/3 | 2002/0066073 | A1 | 5/2002 | Lienhard et al. ............. 717/105 |
| 6,732,361 | B1 | 5/2004 | Andreoli et al. ............. 719/313 | 2002/0078222 | A1 | 6/2002 | Compas et al. .............. 709/232 |
| 6,741,994 | B1 | 5/2004 | Kang et al. .................. 707/102 | 2002/0091803 | A1 | 7/2002 | Imamura et al. ............. 709/220 |
| 6,742,054 | B1 | 5/2004 | Upton, IV ...................... 710/6 | 2002/0099687 | A1 | 7/2002 | Krishnaprasad et al. ........ 707/1 |
| 6,745,208 | B2 * | 6/2004 | Berg et al. ................... 707/201 | 2002/0100036 | A1 | 7/2002 | Moshir et al. ................ 717/173 |
| 6,766,326 | B1 | 7/2004 | Cena ........................... 707/101 | 2002/0103829 | A1 | 8/2002 | Manning et al. ............. 707/513 |
| 6,795,808 | B1 | 9/2004 | Strubbe et al. ............... 704/275 | 2002/0104080 | A1 | 8/2002 | Woodard et al. ............. 717/176 |
| 6,802,061 | B1 | 10/2004 | Parthasarathy et al. ....... 717/173 | 2002/0110225 | A1 | 8/2002 | Cullis .......................... 379/67.1 |
| 6,826,726 | B2 * | 11/2004 | Hsing et al. .................. 715/513 | 2002/0111928 | A1 | 8/2002 | Haddad .......................... 707/1 |
| 6,829,631 | B1 | 12/2004 | Forman et al. ............... 709/202 | 2002/0120685 | A1 | 8/2002 | Srivastava et al. ........... 709/203 |
| 6,845,499 | B2 * | 1/2005 | Srivastava et al. ........... 717/100 | 2002/0129107 | A1 | 9/2002 | Loughran et al. ............ 709/206 |
| 6,857,103 | B1 | 2/2005 | Wason ......................... 715/709 | 2002/0133523 | A1 | 9/2002 | Ambler et al. ............... 707/536 |
| 6,859,908 | B1 | 2/2005 | Clapper ....................... 715/224 | 2002/0149601 | A1 | 10/2002 | Rajarajan et al. ............ 345/619 |
| 6,868,625 | B2 | 3/2005 | Szabo .......................... 715/738 | 2002/0156774 | A1 | 10/2002 | Beauregard et al. ............ 707/3 |
| 6,874,125 | B1 | 3/2005 | Carroll et al. ................ 715/705 | 2002/0156792 | A1 | 10/2002 | Gombocz et al. ............ 707/100 |
| 6,874,143 | B1 | 3/2005 | Murray et al. ............... 717/173 | 2002/0169802 | A1 | 11/2002 | Brewer et al. ............... 707/513 |
| 6,880,129 | B1 | 4/2005 | Lee et al. ..................... 715/763 | 2002/0175955 | A1 | 11/2002 | Gourdol et al. ............. 345/821 |
| 6,883,137 | B1 | 4/2005 | Girardot et al. .............. 715/513 | 2002/0178008 | A1 | 11/2002 | Reynar ........................ 704/272 |
| 6,898,604 | B1 | 5/2005 | Ballinger et al. ............. 707/101 | 2002/0178182 | A1 | 11/2002 | Wang et al. ............... 715/501.1 |
| 6,901,402 | B1 | 5/2005 | Corston-Oliver et al. .... 701/101 | 2002/0184247 | A1 | 12/2002 | Jokela et al. ................. 707/204 |
| 6,904,560 | B1 | 6/2005 | Panda .......................... 715/202 | 2002/0188941 | A1 | 12/2002 | Cicciarelli et al. ............ 717/175 |
| 6,925,457 | B2 | 8/2005 | Britton et al. ................... 707/1 | 2002/0196281 | A1 | 12/2002 | Audleman et al. ........... 345/762 |
| 6,925,470 | B1 | 8/2005 | Sangudi et al. .............. 707/102 | 2002/0198909 | A1 | 12/2002 | Huynh et al. ................ 707/513 |
| 6,944,857 | B1 | 9/2005 | Glaser et al. ................. 717/173 | 2003/0002391 | A1 | 1/2003 | Biggs ............................ 368/82 |
| 6,948,133 | B2 * | 9/2005 | Haley .......................... 715/780 | 2003/0005411 | A1 | 1/2003 | Gerken ........................ 717/120 |
| 6,950,831 | B2 | 9/2005 | Haley ....................... 707/104.1 | 2003/0009489 | A1 | 1/2003 | Griffin ......................... 707/500 |
| 6,950,982 | B1 | 9/2005 | Dourish ....................... 715/512 | 2003/0014745 | A1 | 1/2003 | Mah et al. .................... 717/170 |
| 6,957,385 | B2 | 10/2005 | Chan et al. ................... 715/504 | 2003/0025728 | A1 | 2/2003 | Ebbo et al. .................. 345/744 |
| 6,963,867 | B2 | 11/2005 | Ford et al. ....................... 707/3 | 2003/0046316 | A1 | 3/2003 | Gergic et al. ................ 707/513 |

| | | | |
|---|---|---|---|
| 2003/0050911 A1 | 3/2003 | Lucovsky et al. | 707/11 |
| 2003/0051236 A1 | 3/2003 | Pace et al. | 717/177 |
| 2003/0056207 A1 | 3/2003 | Fischer et al. | 717/174 |
| 2003/0081791 A1 | 5/2003 | Erickson et al. | 380/282 |
| 2003/0083910 A1 | 5/2003 | Sayal et al. | 705/7 |
| 2003/0084138 A1 | 5/2003 | Tavis et al. | 709/223 |
| 2003/0097318 A1 | 5/2003 | Yu et al. | 705/35 |
| 2003/0101190 A1 | 5/2003 | Horvitz et al. | 707/100 |
| 2003/0101204 A1 | 5/2003 | Watson | 708/706 |
| 2003/0101416 A1 | 5/2003 | McInnes et al. | 715/513 |
| 2003/0106040 A1 | 6/2003 | Rubin et al. | 717/106 |
| 2003/0115039 A1 | 6/2003 | Wang | 704/4 |
| 2003/0121033 A1 | 6/2003 | Peev et al. | 717/175 |
| 2003/0126136 A1 | 7/2003 | Omoigui | 707/10 |
| 2003/0140308 A1 | 7/2003 | Murthy et al. | 715/500 |
| 2003/0154144 A1 | 8/2003 | Pokorny et al. | 705/28 |
| 2003/0158841 A1 | 8/2003 | Britton et al. | 707/3 |
| 2003/0158851 A1 | 8/2003 | Britton et al. | 707/100 |
| 2003/0167445 A1 | 9/2003 | Su et al. | 715/513 |
| 2003/0172343 A1 | 9/2003 | Leymaster et al. | 715/500 |
| 2003/0177341 A1 | 9/2003 | Devillers | 712/227 |
| 2003/0182391 A1 | 9/2003 | Leber et al. | 709/217 |
| 2003/0192040 A1 | 10/2003 | Vaughan | 717/173 |
| 2003/0195937 A1 | 10/2003 | Kircher et al. | 709/207 |
| 2003/0212527 A1 | 11/2003 | Moore et al. | 702/179 |
| 2003/0220795 A1 | 11/2003 | Araysantiparb et al. | 704/275 |
| 2003/0229593 A1 | 12/2003 | Raley et al. | 705/55 |
| 2003/0233330 A1 | 12/2003 | Raley et al. | 705/55 |
| 2004/0002939 A1 | 1/2004 | Arora et al. | 707/2 |
| 2004/0003389 A1 | 1/2004 | Reynar et al. | 717/174 |
| 2004/0006564 A1 | 1/2004 | Lucovsky et al. | 707/10 |
| 2004/0006741 A1 | 1/2004 | Radja et al. | 715/513 |
| 2004/0024875 A1 | 2/2004 | Horvitz et al. | 709/226 |
| 2004/0039990 A1 | 2/2004 | Bakar et al. | 715/505 |
| 2004/0044959 A1 | 3/2004 | Shanmugasundaram et al. | 715/513 |
| 2004/0068694 A1 | 4/2004 | Kaler et al. | 715/513 |
| 2004/0083218 A1 | 4/2004 | Feng | 707/100 |
| 2004/0133846 A1 | 7/2004 | Khoshatefeh et al. | 715/500 |
| 2004/0143581 A1 | 7/2004 | Bohannon et al. | 707/100 |
| 2004/0165007 A1 | 8/2004 | Shafron | 345/781 |
| 2004/0199861 A1 | 10/2004 | Lucovsky | 715/500 |
| 2004/0201867 A1 | 10/2004 | Katano | 358/1.15 |
| 2004/0236717 A1 | 11/2004 | Demartini et al. | 707/1 |
| 2005/0050164 A1 | 3/2005 | Burd et al. | 709/217 |
| 2005/0055330 A1 | 3/2005 | Britton et al. | 707/1 |
| 2005/0094850 A1 | 5/2005 | Nakao | 382/103 |
| 2005/0108195 A1 | 5/2005 | Yalovsky et al. | 707/1 |
| 2005/0120313 A1 | 6/2005 | Rudd et al. | 715/866 |
| 2005/0187926 A1 | 8/2005 | Britton et al. | 707/3 |
| 2006/0173674 A1 | 8/2006 | Nakajima et al. | 704/9 |

FOREIGN PATENT DOCUMENTS

| | | |
|---|---|---|
| CN | 200410005390.8 | 10/2008 |
| EP | 0 364 180 A2 | 4/1990 |
| EP | 0481784 A2 | 4/1992 |
| EP | 0598511 A2 | 5/1994 |
| EP | 0872827 A2 | 10/1998 |
| EP | 0810520 B1 | 12/1998 |
| EP | 1093058 A1 | 4/2001 |
| EP | 1280068 A2 | 1/2003 |
| EP | 1361523 A2 | 11/2003 |
| EP | 1376392 A2 | 1/2004 |
| EP | 1 447 754 A1 | 8/2004 |
| EP | 1 452 966 A3 | 9/2004 |
| JP | 64-88771 | 4/1989 |
| JP | 05-174013 | 7/1993 |
| JP | 08-272662 | 10/1996 |
| JP | 09-138636 | 5/1997 |
| JP | 10-171827 | 6/1998 |
| JP | 2000-222394 | 8/2000 |
| JP | 2000-231566 | 8/2000 |
| JP | 2001-014303 | 1/2001 |
| JP | 2001-125994 | 5/2001 |
| JP | 2001-522112 | 11/2001 |
| JP | 2001-0350464 | 12/2001 |
| JP | 2002-041353 | 2/2002 |
| JP | 2002163250 A | 6/2002 |
| JP | 2002-222181 | 8/2002 |
| JP | 2003-141174 | 5/2003 |
| WO | WO 95/07510 A1 | 3/1995 |
| WO | WO 99/17240 A1 | 4/1999 |
| WO | WO 00/54174 A1 | 9/2000 |
| WO | WO 00/67117 | 11/2000 |
| WO | WO 00/73949 A1 | 12/2000 |
| WO | WO 01/18687 A1 | 3/2001 |
| WO | WO 01/37170 A2 | 5/2001 |
| WO | WO 01/186390 A2 | 11/2001 |
| WO | WO 02/099627 A1 | 1/2002 |
| WO | WO 02/15518 A2 | 2/2002 |
| WO | WO 02/42928 A1 | 5/2002 |
| WO | WO2004/012099 A2 | 2/2004 |

OTHER PUBLICATIONS

Japanese Official Action dated Oct. 19, 2007 cited in Japanese Application No. 2003-128417.
U.S. Final Office Action dated Dec. 7, 2007 cited in U.S. Appl. No. 10/426,446.
Russian Official Action dated Oct. 11, 2008 cited in Russian Application No. 2003118722.
Pershikov, V.I., "Explanatory Dictionary in Informatics," Finances and Statistics, Moscow, 1991 (in Russian with translated sections) 5 pgs.
U.S. Final Office Action dated Dec. 18, 2007 cited in U.S. Appl. No. 10/366,141.
U.S. Final Office Action dated Dec. 26, 2007 cited in U.S. Appl. No. 09/841,265.
U.S. Office Action dated Dec. 26, 2007 cited in U.S. Appl. No. 10/377,258.
U.S. Final Office Action dated Jan. 7, 2008 cited in U.S. Appl. No. 10/179,438.
U.S. Final Office Action dated Jan. 9, 2008 cited in U.S. Appl. No. 09/906,467.
David D. Lewis et al., "A Sequential Algorithm for Training Text Classifiers," Spring-Verlag New York, Inc., 1994, pp. 1-10.
U.S. Official Action dated Dec. 20, 2006 in U.S. Appl. No. 10/154,630.
U.S. Final Official Action dated Dec. 26, 2006 in U.S. Appl. No. 10/179,810.
U.S. Official Action dated Jan. 11, 2007 in U.S. Appl. No. 10/184,190.
U.S. Official Action dated Jan. 25, 2007 in U.S. Appl. No. 10/608,267.
European Communication dated Nov. 17, 2006 in EP 03 011 851.7-2211.
U.S. Office Action dated Jan. 25, 2008 cited in U.S. Appl. No. 10/608,267.
European Communication dated Dec. 11, 2006 in EP 03 012 830.0-2211.
Singapore Search Report/Written Opinion dated Jan. 26, 2007 in SG 200500214-2.
U.S. Official Action dated Feb. 6, 2007 cited in U.S. Appl. No. 09/588,411.
U.S. Official Action dated Feb. 7, 2007 cited in U.S. Appl. No. 10/179,438.
U.S. Official Action dated Feb. 21, 2007 cited in U.S. Appl. No. 10/366,141.
U.S. Office Action dated Feb. 8, 2008 cited in U.S. Appl. No. 10/141,712.
U.S. Office Action dated Feb. 15, 2008 cited in U.S. Appl. No. 10/731,899.
U.S. Final Office Action dated Feb. 20, 2008 cited in U.S. Appl. No. 10/154,630.

Singapore Examination Reported (conducted by Austrian Patent Office) dated Jan. 25, 2008 cited in SG Application No. 200500214-2.
Chinese Official Action dated Dec. 28, 2007 cited in Application No. 200410005390.8.
Chinese Official Action dated Jan. 4, 2008 cited in Application No. 200510009487.0.
Wei Ying-bin et al., "A New Technology ColdFusion of Realizing Dynamic Webpage," 2000, 6 pgs. (English language translation, pp. 1-6).
European Examination Report dated Mar. 4, 2006 cited in Ep Application No. 03 012 432.5-1527.
Russian Official Action dated Jan. 11, 2008 cited in Russian Application No. 2004105880/09(006292).
V. Doroth et al., "Modern Computer Vocabulary," St. Petersburg, BHV-Peterburg, 2001, p. 465 (with English language translation).
European Communication dated Feb. 16, 2007 cited in European Application No. 04 003 683.2-2211.
Anonymous, "Adding Data from Other Sources in PowerPoint 2002," Jul. 2002, Internet article, XP-002420700, A Professional Approach Series the E-Zine Approach, http://www.glencoe.com/ps/computered/pas/article.php4?articleld-437, 8 pgs.
Rice, F.C., "Transform XML Files with XSLT When Importing into Microsoft Excel 2002," Jul. 2001, Internet article, XP-002420701, http://msdn2.microsoft.com/en-us/library/aa140055(office.10,d=printer).aspx, 9 pgs.
Johnson, L., "What's So Special About Paste Special?", Jun. 2002, Internet article, XP-002420702, http://pubs.logicalexpressions.com/Pub0009/LPMArticle.asp?ID=40, 5 pgs.
Anonymous, "Moving and Copying Text Tutorial," Aug. 17, 2001, Internet Article, XP-002307566, http://tutorials.findtutorials.com/read/category/102/id/342/p/3, 4 pgs.
U.S. Official Action dated Mar. 9, 2007 cited in U.S. Appl. No. 10/426,446.
U.S. Official Action dated Mar. 12, 2007 cited in U.S. Appl. No. 10/141,712.
U.S. Official Action dated Apr. 10, 2007 cited in U.S. Appl. No. 09/907,418.
Scott Driza, "Learn Word 2000 VBA Document Automation,"*Wordware Publishing, Inc.* 2001, 6 pages.
U.S. Official Action dated Feb. 24, 2006 in U.S. Appl. No. 10/154,630.
U.S. Official Action dated Apr. 5, 2006 in U.S. Appl. No. 10/377,258.
U.S. Official Action dated Apr. 10, 2006 in U.S. Appl. No.10/179,810.
U.S. Official Action dated Apr. 17, 2006 in U.S. Appl. No. 10/179,438.
U.S. Official Action dated Apr. 17, 2006 in U.S. Appl. No. 10/184,190.
U.S. Official Action dated May 26, 2006 in U.S. Appl. No. 09/588,411.
U.S. Official Action dated May 31, 2006 in U.S. Appl. No. 10/141,712.
U.S. Official Action dated Jun. 1, 2006 in U.S. Appl. No. 10/366,141.
U.S. Final Official Action dated Jul. 19, 2006 in U.S. Appl. No. 09/906,552.
U.S. Official Action dated Aug. 2, 2006 in U.S. Appl. No. 10/731,899.
U.S. Official Action dated Aug. 9, 2006 cited in U.S. Appl. No. 10/164,960.
U.S. Final Official Action dated Aug. 18, 2006 cited in U.S. Appl. No. 09/907,418.
U,S, Final Office Action dated Jul. 26, 2007 cited in U.S. Appl. No. 10/164,960.
U.S. Office Action dated Aug. 10, 2007 cited in U.S. Appl. No. 10/179,810.
U.S. Office Action dated Sep. 10, 2007 cited in U.S. Appl. No. 10/179,438.
U.S. Official Action dated Sep. 7, 2006 cited in U.S. Appl. No. 10/155,680.
Malaysian Search Report dated Aug. 2, 2007 cited in Malaysian Application No. PI 20040265.
U.S. Office Action dated Sep. 27, 2007 cited in U.S. Appl. No. 10/608,267.
U.S. Official Action dated Sep. 28, 2006 cited in U.S. Appl. No. 10/608,267.
U.S. Final Official Action dated Oct. 5, 2006 cited in U.S. Appl. No. 09/841,266.
U.S. Official Action dated Oct. 6, 2006 cited in U.S. Appl. No. 10/140,544.
U.S. Official Action dated Oct. 10, 2006 cited in U.S. Appl. No. 09/841,265.
European Communication dated Apr. 19, 2006 in EP 05 000 506.5-1527.
U.S. Final Office Action dated Oct. 19, 2006 cited in U.S. Appl. No. 09/906,467.
European Communication dated Sep. 25, 2006 in EP 03 01 4181.
World Wide Web Consortium, "Document Object Model (DOM) Level 2 Events Specification, Version 1.0", http://www.w3.org/TR/2000/REC-DOM-Level-2-Events-20001113/DOM2-Events.pdf, Nov. 2000, 50 pp.
World Wide Web Consortium, "Document Object Model (DOM) Level 2 Core Specification, Version 1.0", http://www.w3.org/TR/2000/REC-DOM-Level-2-Core-20001113/DOM2-Core.pdf, Nov. 2000, 107 pp.
U.S. Patent Appl. No. 11/924,856 filed Oct. 26, 2007 entitled "Providing Contextually Sensitive Tools and Help Content in Computer-Generated Documents".
U.S. Final Office Action dated Oct. 16, 2007 cited in U.S. Appl. No. 09/907,418.
U.S. Office Action dated Oct. 17, 2007 cited in U.S. Appl. No. 10/155,680.
U.S. Final Office Action dated Oct. 19, 2007 cited in U.S. Appl. No. 10/184,190.
U.S. Final Office Action dated Oct. 19, 2007 cited in U.S. Appl. No. 09/588,411.
U.S. Final Office Action dated Oct. 19, 2007 cited in U.S. Appl. No. 10/141,712.
U.S. Final Office Action dated Oct. 30, 2007 cited in U.S. Appl. No. 09/906,552.
European Communication dated Nov. 9, 2006 in EP 03010292.5.
"Word 2002 Add in: measurement Converter Smart Tag", http://www.microsoft.com/downloads/details.aspx?FamilyID=f67fc42c-5f41-4c3f-9d5a-71354471dc32&DisplayLang=en, retrieved on Nov. 9, 2006, 2 pgs.
"Microsoft Measurement Converter Smart Tag—Chinese Version", http://www.jiyang.gov/cn/laiying/My%20Pictures/%E8%B4%E5%BA%86%E8%BE%89/office2003/FILES/PFILES/COMMON/MSSHARED/SMARTTAG/CMEASURE/1033/CHMCABT.HTM, retrieved on Nov. 7, 2006, 2 pgs.
U.S. Office Action dated Nov. 9, 2006 cited in U.S. Appl. No. 10/184,298.
U.S. Office Action dated Nov. 15, 2006 cited in U.S. Appl. No. 10/179,438.
U.S. Official Action mailed Apr. 1, 2008 cited in U.S. Appl. No. 09/907,418.
U.S. Official Action mailed Apr. 4, 2008 cited in U.S. Appl. No. 10/155,680.
U.S. Official Action mailed Apr. 29, 2008 cited in U.S. Appl. No. 09/588,411.
U.S. Final Official Action mailed Apr. 29, 2008 cited in U.S. Appl. No. 10/179,810.
European Communication Summons to Attend Oral Proceedings dated Mar. 4, 2008 in EP 05 000 506.5-1527.
European Communication Summons to Attend Oral Proceedings dated Mar. 10, 2008 in EP 03 01 0292.5-1527.
Rubin, C., "Microsoft Word 2000 Official Manual", First Edition, Nikkei BP Soft Press, Inc., Aug. 2, 1999, pp. 215-217.
U.S. Office Action dated May 27, 2008 cited in U.S. Appl. No. 09/906,552.
U.S. Examiner's Answer BPAI dated Jun. 5, 2008 cited in U.S. Appl. No. 10/184,298.
U.S. Office Action dated Jun. 11, 2008 cited in U.S. Appl. No. 09/841,265.
U.S. Office Action dated Jun. 12, 2008 cited in U.S. Appl. No. 10/426,446.

U.S. Office Action dated Jun. 13, 2008 cited in U.S. Appl. No. 10/780,376.
U.S. Final Office Action dated Jun. 27, 2008 cited in U.S. Appl. No. 10/377,258.
M. Stowe, "XML in Excel and the Spreadsheet Component", Microsoft Corporation, Aug. 2001, 6 pgs.
C. Heinemann, "Cross-Reference your XML Data", Microsoft Corporation, Dec. 7, 1998, 6 pgs.
D. Obasanjo, "XML_Namespaces and How They Affect Xpath and XSLT", Microsoft Corporation, May 20, 2002, 19 pgs.
European Communication Summons to Attend Oral Proceedings dated May 7, 2008 cited in European Application No. 04002224.6.
Russian Official Action dated Mar. 13, 2008 cited in Russian Application No. 2004104096/09(004398).
Japanese Official Action dated Mar. 28, 2008 cited in Japanese Application No. 2003-178497.
Pixley, "Document Object Model (DOM) Level 2 Events Specification Version 1.0", World Wide Web Consortium, Nov. 13, 2000, www.w3.org/TR/2000/REC-DOM-Level-2-Events-20001113/DOM2-Events.pdf.
European Communication dated Jun. 3, 2008 cited in European Application No. 03 011 851.7-2211.
Japanese Official Action dated Apr. 18, 2008 cited in Japanese Application No. 2003-128417.
U.S. Official Action dated May 14, 2007 cited in U.S. Appl. No. 09/906,552.
U.S. Final Official Action dated May 18, 2007 cited in U.S. Appl. No. 10/155,680.
U.S. Official Action dated May 30, 2007 cited in U.S. Appl. No. 09/906,467.
U.S. Final Official Action dated Jun. 15, 2007 cited in U.S. Appl. No. 10/731,899.
U.S. Office Action dated Jun. 28, 2007 cited in U.S. Appl. No. 09/841,266.
U.S. Final Office Action dated Jul. 12, 2007 cited in U.S. Appl. No. 10/184,298.
U.S. Office Action dated Jul. 13, 2007 cited in U.S. Appl. No. 10/154,630.
U.S. Office Action dated Jul. 20, 2007 cited in U.S. Appl. No. 09/841,265.
"The Spatial Smart Tag", Geomatic Technologies, Mar. 10, 2005, 2 pp.
Harmon, D., "Microsoft MapPoint 2002", Geoworld Quick-Take Reviews, Aug. 2001, 3 pp.
Irie R. et al., "Resources for Place Name Analysis", May 28, 2004, 4 pp.
Rajabifard, A. et al., "Creating an Enabling Platform for the Delivery of Spatial Information", Spatial Sciences Institute Biennial Conference, Sep. 12, 2005, 10 pp.
Camarda, B., Special Editing Using® Microsoft® Office Word 2003, Que, Dec. 12, 2003, pp. 1-5.
Ivens, K., Office XP Smart Tags, Microsoft, Mar. 6, 2002, pp. 1-4.
Frye, C., Microsoft Office Systems: Step by Step, Microsoft Press, 2003 Edition, Sep. 3, 2003, pp. 1-6.
U.S. Official Action mailed Sep. 8, 2006 in U.S. Appl. No. 10/948,948.
U.S. Official Action mailed Feb. 15, 2007 in U.S. Appl. No. 10/948,948.
U.S. Official Action mailed Oct. 18, 2007 in U.S. Appl. No. 10/948,948.
U.S. Official Action mailed Mar. 20, 2008 in U.S. Appl. No. 10/948,948.
U.S. Official Action mailed Oct. 16, 2008 in U.S. Appl. No. 10/948,948.
U.S. Official Action mailed Oct. 16, 2008 in U.S. Appl. No. 10/154,630.
European Search Report dated Dec. 12, 2006 in European Application No. 05 105 000.3-1527.
European Examination Report dated Oct. 9, 2007 in European Application No. 05 105 000.3-1527.
European Preliminary Opinion dated Aug. 27, 2008 cited in European Application No. 04002224.6—1527 / 1447754.
Chinese Official Action dated Dec. 7, 2007 in Chinese Application No. 200510088529.4.
Chinese Second Official Action dated Aug. 15, 2008 in Chinese Application No. 200510088529.4.
Chilean Second Office Action cited in Chilean Application No. 67-2005 (date unknown).
Malaysian Official Action dated Aug. 29, 2008 cited in Malaysian Application No. PI 20031902.
Polish Official Action dated Aug. 27, 2008 in Polish Application No. P360520.
Polish Official Letter dated Jun. 24, 2008 cited Polish Application No. P 365553.
U.S. Final Office Action dated Jul. 29, 2008 cited in U.S. Appl. No. 10/141,712.
"XML Schema Part 2: Datatypes," W3C, May 2, 2001, http://www.w3.org/TR/2001/REC-xmlschema-2-20010502/, pp. 1-146 (separated into 2 documents—A & B).
U.S. Office Action dated Aug. 1, 2008 cited in U.S. Appl. No. 10/366,141.
Ghamrawi et al., "Collective Multi-Label Classification," ACM, 2005, pp. 195-200.
Polish Official Action dated Jul. 21, 2008 cited in Polish Application No. P 364854.
Japanese Office Action dated Jul. 18, 2008 cited in Japanese Application No. 2002-207514.
European Communication Minutes of Oral Proceedings and Decision dated Sep. 15, 2008 in European Application No. 05 000 506.5-1527.
Polish Second Official Action dated Oct. 28, 2008 in Polish Application No. P36553.
Australian First Official Action dated Oct. 21, 2008 cited in Application No. 2003204800.
U.S. Final Office Action dated Dec. 24, 2008 cited in U.S. Appl. No. 09/841,265.
Sharon Oviatt et al., "Integration and Synchronization of Input Modes during Multimodal Human-Computer Interaction," CHI 97, Atlanta, Georgia, Mar. 22-27, 1997, pp. 415-422.
U.S. Office Action dated Dec. 23, 2008 cited in U.S. Appl. No. 10/179,810.
U.S. Office Action dated Jan. 5, 2009 cited in U.S. Appl. No. 10/141,712.
European Statement regarding Grounds of Appeal dated Jan. 13, 2009 cited in Application No. 04 002 224.6.
Shiroiwa, K., "iMac&iBook, Must-see for User, Full of Recommended Setting Methods and Specially Selected Tips, Mastering Mac OS9", MacPeople, ASCII Corporation, Japan, Dec. 3, 1999, vol. 5, No. 24, p. 50 (in Japanese—no translation yet).
(Previously cited) Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53 (with English language translation).
U.S. Final Office Action dated Jan. 22, 2009 cited in U.S. Appl. No. 10/366,141.
U.S. Office Action dated Feb. 4, 2009 cited in U.S. Appl. No. 10/377,258.
U.S. Final Office Action dated Mar. 4, 2009 cited in U.S. Appl. No. 10/780,376.
European Summons to Attend Oral Proceedings dated Feb. 26, 2009 cited in European Application No. 0301283.0-2211 (60001.0182EP01).
European Communication dated Mar. 18, 2009 cited in European Application No. 04003683.2-2211 (60001.0216EP01).
European Summons to Attend Oral Proceedings dated Mar. 20, 2009 cited in European Application No. 03012830.0 (60001.0182EP01).
Japanese Official Action dated Feb. 6, 2009 cited in Japanese Application No. 2003-180218 (60001.0190JP01).
Japanese Official Action dated Feb. 13, 2009 cited in Japanese Application No. 2003-162911 (60001.0181JP01).
Japanese Official Action dated Feb. 24, 2009 cited in Japanese Application No. 2003-161338 (60001.0182JP01).
Japanese Official Action dated Mar. 6, 2009 cited in Japanese Application No. 2004-042140 (60001.0216JP01).

Japanese Office Action dated Oct. 10, 2008 cited in Application No. 2004-037158.

Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53.

Chinese Office Action dated Oct. 17, 2008 cited in Application No. 03145242.6.

Santos, C.A.S., L.F.G Soares, G.L. de Souza and J.P. Courtiat; *Design methodology and formal validation of hypermedia documents*; Proceedings of the sixth ACM international conference on multimedia, (1998) p. 39-48.

Terveen, Loren, Will Hill and Brian Amento; *Constructing, organizing, and visualizing collections of tropically related Web resources*; ACM Trans. Comput.-um. Interact. 6, 1 (Mar. 1999) p. 67-94.

Barrett, Rob, Paul P. Maglio and Daniel C. Kellem; *How to personalize the Web*; Conference proceedings on human factors in computing systems (1997) p. 75-82.

Marx, Matthew and Chris Schmandt; *Clues: dynamic personalized message filtering*; Proceedings of the ACM 1996 conference on computer supported cooperative work (1996) p. 113-121.

Goschka, Karl M. And Jurgen Falb; *Dynamic hyperlink generation for navigation in relational databases*; Proceedings of the tenth ACM conference on hypertext and hypermedia: returning to our diverse roots (1999) p. 23-24.

Pentland, Alex; *Perceptual user interfaces: perceptual intelligence*; Commun. ACM 43,3 (Mar. 2000) p. 35-44.

Stairmand, Mark A.; *Textual context analysis for information retrieval*; Proceedings of the 20th annual international ACM SIGIR conference on research and development in information retrieval (1997) p. 140-147.

Glushko, Robert J., Jay M. Tenenbaum and Bart Meltzer; *An XML framework for agent-based E-commerce*; Commun. ACM 42,3 (Mar. 1999) p. 106.

Kukich, Karen; *Technique for Automatically Correcting Words in Text*; ACM Comput. Surv., 24, 4 (Dec. 1992); pp. 377-439.

Marx, Matt and Chris Schmandt; *Putting People First: Specifying Proper Names in Speech Interfaces*; Proceedings of the ACM Symposium on User Interface Software and Technology; 1994; pp. 29-37.

Ford, Bryan, Mike Hibler, Jay Lepreau, Roland McGrath and Patrick Tullman; *Interface and execution models in the fluke kernel*; Proceedings of the third symposium on operating systems design and implementation, (1999) p. 101-115.

Desmarais, Michel C. and Jiming Liu; *Exploring the applications user-expertise assessment for intelligent interfaces*; Proceedings of the conference on human factors in computing systems, (1993) p. 308-313.

Foley, James D.; *Future directions in user-computer interface software*; Conference proceedings on organizational computer systems, (1991) p. 289-297.

Hartson, H. Rex and Deborah Hix; *Human-computer interface development: concepts and systems for its management*; ACM Comput. Surv. 1 (Mar. 1989) p. 5-92.

Foley, Jim; *Integrating computer technology, people technology; strategies and case studies from Georgia Tech's Graphics, Visualization and Usability Center*; Proceedings of the workshop on advanced visual interfaces, (1994) p. 34-43.

Tsai, M., P. Reiher and G.J. Popek; *Command management system for next-generation user input*; Proceedings of the seventh workshop on hottopics in operating systems, (1999) p. 179-84.

*Microsoft Computer Dictionary*, Microsoft, Microsoft Press, Fifth Edition, p. 409.

Kuenning, Geoff, "Using ISPELL from Emacs", theochem.ki.ku.dk/on_line_docs/ispell/ispell_1.html, 4 pp., publication date unknown.

"Spellout Command", Commands Reference, vol. 5, rz.uni-hohenheim.de/betriebssysteme/unix/aix/aix_4.3.3_doc/base_doc/usr/share/man/inf . . . , 1 page, publication date unknown.

"Chapter 8—Standard Input and Output", comp.lancs.ac.uk/computing/users/eiamjw/unix/chap8.html, 3 pp., publication date unknown.

Panagiotis, Christias, Man-cgi 1.15, physics.umn.edu/cgi-bin/man-cgi?spell, 1994,5 pp.

Bischof, Hans-Peter, "Spell, Spellin, Spellout—Finding Spelling Errors", vorlesungen.uniosnabrueck.de/informatik/shellscript/Html/Man/~Man_NeXT_html/html . . . , Apr. 21, 1997,2 pp.

"Module 123—Spell", duplex.hypermart.net/books/bsd/501-504.html, 4 pp., publication date unknown.

Panagiotis, Christias, Man-cgi 1.15, calpoly.edu/cgi-bin/man-cgi?spell+1, 1994,3 pp.

Martensson, Bengt, "Thread-Enhanced Spell Front End for GNU Emacs + Detex + Delatex", geocrawler.com/archives/3/337/1987/8/0/1871981/, Aug. 20, 1987, 1 page.

Willisson, Pace, Ispell (1), rt.com/man/findaffix.1.html, 1983, 15 pp.

Willisson, Pace, Ispell (1), "User Commands", .csee.usf.edu/cgi-bin/man-cgi?ispell, 1983, 18 pp.

"Handout 38: Spell Checking, Word Counting, and Textual Analysis", courses.cs.emporia.edu/pheattch/courses/2002/cs501s02/hand38/, 3 pp., publication date unknown.

Keunning, Geoff, "International Spell", cs.ucla.edu/geoff.ispell.html, 3 pp., publication date unknown.

Ispell 4, "Ispell—Format of Ispell Dictionaries and Affix Files", bigbiz.com/cgi-bin/manpage?4+ispell, 11 pp., publication date unknown.

McMahon, Lee. E., "SED—A Non-Interactive Text Editor," Bell Laboratories, Murray Hill, New Jersey 07974, Aug. 15, 1978, p. 16.

Beitner, N.D.; Hall, W.; Goble, C.A., "Multimedia Support and Authoring in Microcosm: An Extended Model," Dept. of Electronics and Computer Science, Univ. of Southampton, Southampton SO17 1BJ, UK; Dept. of Computer Science, Univ. of Manchester, Oxford Road, Manchester MI3 9PL, UK, pp. 1-12, publication date unknown.

IBM Corporation, IBM Research Disclosure #368; "Multimedia Hyperlinks Automatically Created For Reference Documents," *IBM Technical Disclosure*Bulletin, Jun. 1993, pp. 1-5.

*The Complete LINUX™ Operating System 5.2 Deluxe*, Red Hat,® Macmillian Digital Publishing USA, A Viacom Company, Red Hat Software, Inc., ISBN 1-57595-199-1B, 1995-1998, pp. 1-385.

*User Manual For AddressMate and AddressMate Plus*, CoStar Corporation, AddressMate Software, 1994-1995, pp. 1-210.

Getting Results With Microsoft® Office 97 *Real World Solutions For The Work You Do*, Microsoft Corporation, 1995-1997, pp. 1-703.

*InfoCentral™ 7*, User's Manual, Corel Corporation, vol. 1, Version 7.0, 1996, pp. 1-86.

Corel® Office Professional 7 Quick Results User's Manual, vol. 1, Version 7.0 (first printing), Corel Corporation, Limited, pp. 1-531, publication date unknown.

Novell GroupWise User's Guide for Windows 16-Bit Version 5.2, Novell, Inc., 1993-1997, pp. 1-231.

Novell GroupWise User's Guide for Windows 32-Bit Version 5.2, Novell, Inc., 1998, pp. 1-318.

Claris Em@iler Getting Started User's Guide, For Macintosh, Claris Corporation, 1995-1997,61 pp.

Developer's Guide To Apple Data Detectors, For Version 1.0.2., Apple Computer, Inc., 1997, pp. 1-33.

Apple Data Detectors User's Manual, Apple Computer, Inc., 1997, pp. 1-15.

Nardi, Bonnie A.; Miller, James R.; Wright, David J., "Collaborative, Programmable Intelligent Agents," Jim Miller/Miramontes Computing, Apple Computer Advanced Technology Group, miramontes.com/writing/add-cacm/add-cacm/html, Mar. 1998, pp. 1-11.

Hewkin, "Smart Tags—the Distributed-Memory Resolution", IEE Review, Jun. 22, 1989, pp. 203-206.

Measuring Units Conversion Table—web.archie.org—1997 Internet French Property, pp. 1-4.

IBM Technical Disclosure Bulletin, "National Language Support Enhancement for Culture-Specific Operations", Nov. 1, 1993, vol. 36, Issue 11, pp. 629-638.

Towers, J. Tarin, Visual Quickstart Guide: Dreamweaver 2 for Windows and Macintosh, 1999, Peachpit Press, pp. 150-151.

Cornell, Paul, "Developing Smart Tag DLLs", MSDN Library, msdn.microsoft.com/library/default.asp?url=/library/enus/dnsmarttag/html/odc_smarttags.asp, Apr. 2001, pp. 8.

Menu Customizing, IBM Technical Disclosure Bulletin, vol. 34, No. 1, Jun. 1991, pp. 91-92 (4 pp. total).

Perry, Brad, et al., "Discovering Similar Resources by Content Park-Linking", Proceedings of the Sixth International Conference on Information and Knowledge Management, published by ACM Press 1997, pp. 317-324.

Schulz, Charles, "Writing Applications for Uniform Operation on a Mainframe or PC: A Metric Conversion Program", Lockheed Missles & Space Company, Inc., Sunnyvale, CA, May 1990, pp. 348-361.

Devanbue, P. et al., "Chime: customizable hyperlink insertion and maintenance engine for software engineering environments", Software Engineering, Publication date: 1999, ISBN: 1-58113-07400.

"Using Flyswat", flywsat.com/using.html, download date: Sep. 28, 1999, 1 pp.

"What is Flyswat", flyswat.com, download date: Sep. 28, 1999, 5 pp.

"Intelligent Text Processing: About", syntalex.co.uk/about/about. html, download date: Aug. 7,1999, 1 pp.

"Intelligent Text Processing: Automatic Cross-Referencing", yntalex.co.uk/services/acrl.html, download date Aug. 7, 1999, 3 pp.

"Intelligent Text Processing: Case Study: Context", casestudies/context.html, download date: Aug. 7, 1999, 3 pp.

"Integrating with External Systems: iPlanet™ Unified Development Server", Sun Microsystems, Inc., Ver. 5.0, Aug. 2001, pp. 127-156.

Sperberg-McQueen, C.M. and Thompson, Henry, "XML Schema", W3C Architecture Domain,w3.org/XML/Schema, 2000-2002, pp. 1-10.

Quin, Liam, "Extensible Markup Language (XML)", W3C Architecture Domain, w3.org/XML/, 1996-2002, pp. 1-3.

Clark, James, and DeRose, Steve, "XML Path Language (XPath), Version 1.0", W3C, w3.org/TR/xpath, 1999-2000, pp. 1-31.

"Microsoft BizTalk Server 2002—Using BizTalk Mapper", Microsoft.com/library/en-us/bts_2002/htm/lat_xmltools_map_intro_zkqb.asp ... , Microsoft Corporation, 1999-2001, pp. 1-2.

"BizTalk Server 2002 Mapper User Interface", msdn.microsoft.com/library/enus/bts_2002/htm/lat_xmltools_map_concept_codw..., Microsoft Corporation, 1999-2001, p. 1.

"BizTalk Server 2002 Compiling Maps", msdn.microsoft.com/library/enus/bts_2002/htm/lat_xmltools_map_concept_drgl.a..., Microsoft Corporation, 1999-2001, p. 1.

"BizTalk Server 2002 Testing Maps", msdn.microsoft.com/library/enus/bts_2002/htm/lat_xmltools_map_concept_fhhy.a..., Microsoft Corporation, 1999-2001, pp. 1-2.

"BizTalk Server 2002 View Links and Functoids By Using Grid Preview", msdn.microsoft.com/library/enus/bts_2002/htm/lat_xmltools_map_check_fuwn.as..., Microsoft Corporation, 1999-2001, p. 1.

"The StarOffice™ 6.0 Suite: New Features Guide", Sun Microsystems, V. 1.1, Jul. 2002, pp. 1-31.

"New Microsoft Office Family Application Taps Power of Industry-Standard XML", microsoft.com/presspass/press/2002/oct02/10-09officefamilypr.mspx, Microsoft Corporation, Oct. 2002-Feb. 2003, pp. 1-2.

"Q&A: How 'XDocs' Alters the Paradigm for Gathering Business-Critical Information", microsoft.com/presspass/press/2002/oct02/10-09officefamily.mspx, Microsoft Corporation, Oct. 2002-Feb. 2003, pp. 1-4.

"InfoPath: Microsoft Names New Product from Office Group", microsoft.com/presspass/press/2003/feb03/02-10infopath.mspx, Microsoft Corporation, Oct. 2002-Feb. 2003, pp. 1-4.

"Microsoft Unveils Visual Studio.NET Enterprise Tools", Microsoft Corporation, microsoft.com/presspass/press/2001/may01/05-21vseepr.mspx, May 2001, pp. 1-4.

"Microsoft Extends XML Web Services Support in .NET Enterprise Servers Through Visual Studio .NET", www.microsoft.com/presspass/press/2002/feb02/02-13servervspr.mspx, Microsoft Corporation, Feb. 2002, pp. 1-3.

"How to Use XSL to Transform Excel XML Spreadsheet for Server-Side Use", support.microsoft.com/default.aspx?scid=kb;en-us;278976, Microsoft Corporation, Aug. 2004, pp. 1-7.

Mueller, Jennifer M., "Work Smarter with Smart Tags", Journal of Accounting—Online, vol. 194, No. 5, Nov. 2002, aicpa.org/pubs/jofa/nov2002/Mueller.htm>, retrieved on Apr. 22, 2005.

M. Fernandez et al., "SilkRoute: trading between relations and XML", Computer Networks, vol. 33, No. 1-6, Jun. 2000, pp. 723-745.

V. Braganholo, "Updating Relational Databases Through XML Views", Technical Report, Sep. 2002, pp. 1-61.

G. Falquet et al., "Design and Analysis of Active Hypertext Views on Databases", Information Sciences Institute, Jan. 2002, pp. 1-24.

S. Ceri et al., "Deriving Production Rules for Incremental View Maintenance", Proceedings of the 17th International Conference on Very Large Data Bases, Sep. 1991, pp. 577-589.

A. Bonifati, "Active Behaviors within XML Document Management", EDBT Ph. D. Workshop, Mar. 2000, pp. 1-4.

"Integrated Development Enviorment (IDE)",tova.com/products_ide.html, Jun. 2002, pp. 1-2.

"Altova markup your mind?" altova.com/products_ide.html, Dec. 2002, pp. 1-3.

Arbortext, "Arbortext and Accessibilty", arbortext.com/html/accessibility.html, Dec. 2002, pp. 1-5.

Arbortext, "XML Compliance, 100% Pure XML", arbortext.com/html/xml_compliance, Dec. 2002, pp. 1-3.

Arbortext, "Schemas", arbortext.com/html/schemas.html, Dec. 2002, pp. 1-3.

Arbortext, "Arbortext's Support for XSL-FO", arbortext.com/html/xsl-fo.html. Dec. 2002, pp. 1-4.

Corel, "Corel XMetal4, Making XML Content Creation Easy", corel.com/servlet/Satellite?pagename, Nov. 2003, pp. 1-2.

Corel, "Corel XMetal 4 and Interwoven TeamXML", corel.com/futuretense_cs/ccurl/corel+xml+4+and+interwoven+teamxml.pdf , Aug. 2003, pp. 1-2.

Corel, "The Corel-XyEnterprise XML Solution", corel.com/futuretense_cs/ccurl/corel+and+XY+enterprise+XML+solution.pdf, Aug. 2003, pp. 1-2.

Brooks-Bilson, "Programming ColdFusion" [electronic resource] 2001, Safari Tech Books Online, 1st Edition, 25 pp.

Wilker, John, "ColdFusion MX Adds J2EE, XML, and Web Services Compatibility", Aug. 9, 2002, builder.com.com/5102-6387-104585.html, 3 pp.

Homer, Alex et al., Professional Active Services Pages, 1997, Wrox Press Ltd., Section"Client-Side Scripting and Components", subsection "Choosing Your Applets, and Controls", 16 pp.

Flanagan, D., "JavaScript—The Definitive Guide, Fourth Edition", Jan. 2002, O'Reilly, 12 pp.

Brockschmidt, K., "Inside OLE, Second Edition", 1995, Microsoft Press, p. 169.

Toth, V., "Visual C++ 4 Unleashed", 1996, Sams Publishing, p. 174.

Sriram, V., "ComponentXchange: An E-Exchange for Software Components", Master Thesis, CitSeer, May 2001, pp. i-v, 1-77.

Bosak, "XML: The Universal Publishing Format", SGML/XML Europe '98, May 1998, pp. A1-C17.

Kristensen, "Template Resolution in XML/HTM", Computer Networks and ISDN Systems, vol. 30, 1998, pp. 239-249.

Fan et al., "FormPlus: A Form Authoring Toolkit", Proceedings of the Fourteenth Annual Computer Software and Applications Conference, Oct. 31, 1990-Nov. 2, 1990, pp. 255-260.

Boone, "Concept Features in Re: Agent, An Intelligent Email Agent", Proceedings of the 2nd International Conference on Autonomous Agents, May 9-13, 1998, pp. 141-148.

Takkinen et al., "CAFÉ: A Conceptual Model for Managing Information in Electronic Mail", Proceedings of the Annual Hawaii International Conference on System Sciences, 1998, pp. 44-53.

"Smart Tags: Dumb Technology?", webreference.com, Online, Aug. 29, 2001, http://www.webreference.corn/xml/column30/3.html, 3 pp.

"Being 'Smart' with Smart Tags in Office XP", Create for Mississippi, Aug. 2001, create.cett.msstate.edu/create/howto/smart_tags.pdf, 7 pp.

Harold, E.R., "XML: Extensible Markup Language", IDG Books Worldwide, Books 24x7.com printout, 1998, pp. 1-11.

Marais, Hannes, "Supporting Cooperative and Personal Surfing With a Desktop Assistant", 1997, ACM Press, pp. 129-138.

U.S. Appl. No. 09/818,157, filed Mar. 27, 2001, entitled "Automatically Adding Proper Names to a Database".

U.S. Appl. No. 09/841,265, filed Apr. 24, 2001, entitled "Method and System for Applying Input Mode Bias".

U.S. Appl. No. 09/841,266, filed Apr. 24, 2001, entitled "Method and System for Providing Electronic Commerce Actions Based on Semantically Labeled Strings".

U.S. Appl. No. 09/906,552, filed Jul. 16, 2001, entitled "Method and System for Providing Restricted Actions for Recognized Semantic Categories".

U.S. Appl. No. 09/906,467, filed Jul. 16, 2001, entitled "Application Program Interfaces for Semantically Labeling Strings and Providing Actions Based on Semantically Labeled Strings".

U.S. Appl. No. 09/907,418, filed Jul. 17, 2001, entitled "Method and System for Defining Semantic Categories and Actions".

U.S. Appl. No. 09/588,411, filed Jun. 6, 2000, entitled "Method and System for Semantically Labeling Strings and Providing Actions Based on Semantically Labeled Strings".

U.S. Appl. No. 10/141,712, filed May 9, 2002, entitled "Method, System, and Apparatus for Converting Dates Between Calendars and Languages Based Upon Semantically Labeled Strings".

U.S. Appl. No. 10/154,630, filed May 23, 2002, entitled "Method, System, and Apparatus for Converting Numbers Based Upon Semantically Labeled Strings".

U.S. Appl. No. 10/140,544, filed May 7, 2002, entitled "Method, System, and Apparatus for Converting Numbers Between Measurement Systems Based Upon Semantically Labeled Strings".

U.S. Appl. No. 10/155,680, filed May 23, 2002, entitled "Method, System, and Apparatus for Converting Currency Values Based Upon Semantically Labeled Strings".

U.S. Appl. No. 10/164,960 filed Jun. 6, 2002, entitled "Providing Contextually Sensitive Actions and Help Content in Computer-Generated Documents".

U.S. Appl. No. 10/164,260 filed Jun. 5, 2002, entitled "Mechanism for Downloading Software Components from a Remote Source for Use by a Local Software Application".

U.S. Appl. No. 10/731,899, filed Dec. 9, 2003, entitled "Mechanism for Downloading Components Associated with XML Documents and Smart Documents".

U.S. Appl. No. 10/179,810, filed Jun. 25, 2002, entitled "Method, System, and Apparatus for Performing Custom Actions on Digital Content".

U.S. Appl. No. 10/178,680, filed Jun. 24, 2002, entitled "System and Method for Incorporating Smart Tags in Online Content".

U.S. Appl. No. 10/179,438, filed Jun. 25, 2002, entitled "Method and System for Dynamically Providing Actions Associated with Semantically Labeled Strings".

U.S. Appl. No. 10/184,298, filed Jun. 27, 2002, entitled "Method and System for Associating Actions with Semantic Labels in Electronic Documents".

U.S. Appl. No. 10/366,141 filed Feb. 13, 2003, entitled "Linking Elements of a Document to Corresponding Fields, Queries and/or Procedures in a Database".

U.S. Appl. No. 10/377,258 filed Feb. 28, 2003, entitled "Method and System for Enhancing Paste Functionality of a Computer Software Application".

U.S. Appl. No. 10/426,446, filed Apr. 29, 2003, entitled "Methods and System for Recognizing Names in a Computer-Generated Document and for Providing Helpful Actions Associated with Recognized Names".

U.S. Appl. No. 10/608,267 filed Jun. 27, 2003, entitled "Leveraging Markup Language Data for Semantically Labeling Text Strings and Data and for Providing Actions Based on Semantically Labeled Text Strings and Data".

U.S. Appl. No. 10/780,376 filed Feb. 17, 2004, entitled "Methods and Systems for Providing Automatic Actions on Recognized Text Strings in a Computer-Generated Document".

U.S. Appl. No. 10/184,190 filed Jun. 27, 2002, entitled "System and Method for Providing Namespace Related Information".

U.S. Official Action dated Dec. 29, 2003 in U.S. Appl. No. 09/588,411.

U.S. Official Action dated Feb. 12, 2004 in U.S. Appl. No. 10/154,630.

U.S. Official Action dated Mar. 29, 2004 in U.S. Appl. No. 09/906,552.

U.S. Official Action dated Jun. 14, 2004 in U.S. Appl. No. 09/588,411.

U.S. Official Action dated Jun. 18, 2004 in U.S. Appl. No. 09/818,157.

U.S. Official Action dated Jul. 15, 2004 in U.S. Appl. No. 09/906,467.

U.S. Official Action dated Aug. 20, 2004 in U.S. Appl. No. 09/841,266.

U.S. Official Action dated Sep. 29, 2004 in U.S. Appl. No. 09/907,418.

U.S. Official Action dated Oct. 6, 2004 in U.S. Appl. No. 09/818,157.

U.S. Official Action dated Nov. 2, 2004 in U.S. Appl. No. 10/178,680.

U.S. Official Action dated Dec. 8, 2004 in U.S. Appl. No. 09/588,411.

U.S. Official Action dated Jan. 25, 2005 in U.S. Appl. No. 09/906,552.

U.S. Official Action dated Jan. 26, 2005 in U.S. Appl. No. 10/154,630.

U.S. Official Action dated Mar. 1, 2005 in U.S. Appl. No. 09/818,157.

U.S. Official Action dated Mar. 17, 2005 in U.S. Appl. No. 09/841,265.

U.S. Official Action dated Mar. 24, 2005 in U.S. Appl. No. 10/141,712.

U.S. Official Action dated Apr. 8, 2005 in U.S. Appl. No. 10/164,960.

U.S. Official Action dated Apr. 19, 2005 in U.S. Appl. No. 09/841,266.

U.S. Official Action dated May 5, 2005 in U.S. Appl. No. 09/906,467.

U.S. Official Action dated May 6, 2005 in U.S. Appl. No. 09/907,418.

U.S. Official Action dated May 20, 2005 in U.S. Appl. No. 10/184,298.

U.S. Official Action dated Jun. 3, 2005 in U.S. Appl. No. 10/154,630.

U.S. Official Action dated Jun. 6, 2005 in U.S. Appl. No. 10/164,260.

U.S. Official Action dated Jun. 24, 2005 in U.S. Appl. No. 10/140,544.

U.S. Official Action dated Jul. 25, 2005 in U.S. Appl. No. 10/179,438.

U.S. Official Action dated Sep. 2, 2005 in U.S. Appl. No. 10/366,141.

U.S. Official Action dated Oct. 5, 2005 in U.S. Appl. No. 10/179,810.

U.S. Official Action dated Oct. 20, 2005 in U.S. Appl. No. 09/906,552.

U.S. Official Action dated Nov. 2, 2005 in U.S. Appl. No. 10/184,190.

U.S. Official Action dated Nov. 10, 2005 in U.S. Appl. No. 10/164,260.

U.S. Official Action dated Nov. 15, 2005 in U.S. Appl. No. 09/841,265.

U.S. Official Action dated Nov. 22, 2005 in U.S. Appl. No. 10/141,712.

U.S. Official Action dated Dec. 5, 2005 in U.S. Appl. No. 09/907,418.

U.S. Official Action dated Dec. 14, 2005 in U.S. Appl. No. 10/608.267.

U.S. Official Action dated Dec. 15, 2005 in U.S. Appl. No. 10/155,680.

U.S. Official Action dated Jan. 11, 2006 in U.S. Appl. No. 09/841,266.

U.S. Official Action dated Jan. 17, 2006 in U.S. Appl. No. 10/140,544.

U.S. Official Action dated Feb. 2, 2006 in U.S. Appl. No. 09/906,467.

U.S. Official Action dated Feb. 16, 2006 in U.S. Appl. No. 10/184,298.

Mexican Official Action dated Feb. 11, 2009 cited in Application No. PA/a/2003/005451.

Chinese Final Rejection dated Mar. 13, 2009 cited in Application No. 03145242.6.

Japanese Final Rejection dated Mar. 17, 2090 cited in Application No. 2004-037158.

Japanese Final Rejection dated Apr. 3, 2009 cited in Application No. 2002-207514.

U.S. Office Action dated Apr. 20, 2009 cited in U.S. Appl. No. 10/426,446.

U.S. Office Action dated Apr. 27, 2009 cited in U.S. Appl. No. 10/154,630.

Australian First Examiner's Report dated Sep. 15, 2008 in Application No. 2003204379.

Japanese Final Official Action dated Nov. 25, 2008 cited in Application No. 2002-207514.

Japanese Official Action dated May 26, 2009 cited in Application No. 2005-039754.

Chinese Decision on Rejection dated Jul. 3, 2009 cited in Application No. 03143003.1.

European Summons to Attend Oral Proceedings dated Aug. 5, 2009 cited in Application No. 03003931.7.

Polish Official Notice dated Aug. 25, 2009 cited in Application No. P.365553/DP.

Australian Official Action dated Sep. 11, 2009 cited in Application No. 2003204478.

Norwegian Official Action dated Aug. 24, 2009 cited in Application No. 2003 2550.

Polish Official Notice dated Sep. 22, 2009 cited in Application No. P. 364854/DP.

Polish Official Notice dated Sep. 23, 2009 cited in Application No. P. 360520/DP.

Korean Official Action dated Sep. 30, 2009 cited in Application No. 10-2003-40988.

Japanese Official Notice of Final Rejection dated Oct. 2, 2009 cited in Application No. 2003-162911.

Malaysian Examination Report dated Nov. 30, 2009 cited in Application No. PI 20040559.

Australian Third Official Action dated Dec. 23, 2009 cited in Application No. 2003204478.

U.S. Office Action dated Oct. 22, 2009 cited in U.S. Appl. No. 10/377,258.

Japanese Final Office Action dated Oct. 27, 2009 cited in Application No. 2003-161338.

Russian Official Action dated Jun. 21, 2009 cited in Application No. 2005104223/09.

D. Richter, "Windows for professionals" (Win32 API programming for Windows NT 3.5 and Windows 95, translation from English, Moscow: Russian Edition, 1995, ISBN 5-7502-0010-8, pp. 26, 31, 215.

U.S. Final Office Action dated Nov. 30, 2009 cited in U.S. Appl. No. 10/179,810.

Glover et al., "Interferring hierarchical Descriptions," ACM, 2002, pp. 507-514.

Australian First Offical Action Report dated Jan. 18, 2009 cited in Application No. 2004200459.

* cited by examiner

```
                    <resume>
202
                    <name>John Doe</name>
405
                       <objective>Rewarding employment</ojbective>
                         <education>
                            <p>Private University</p>
                            <p>Masters of Business Administration</p>
                            <p>Big Name State School</p>
                            <p>Bachelors of Political Science</p>
                         </education>
                       <experience>
                          <p>Project manager for major project.
430                        Helped keep team on schedule and under
                           budget.</p>
                                                                    415
                       </experience>
                    </resume>
                        Professor Smith
                               425
```

OldXMLNode: <p>
NewXMLNode: None

FIG. 4

```
<resume>
    <name>John Doe</name>
    <objective>Rewarding employment</objective>
        <education>
            <p>Private University</p>
            <p>Masters of Business Administration</p>
            <p>Big Name State School</p>
            <p>Bachelors of Political Science</p>
        </education>
        <experience>
            <p>Project manager for major project.
            Helped keep team on schedule and under
            budget.</p>
        </experience>
        <references>Professor Smith</references>
</resume>
```

OldXMLNode: None
NewXMLNode: <references>

OldXMLNode: <references>
NewXMLNode: <objective>

FIG. 5

```
<resume>
<name>John Doe</name>
    Rewarding employment
    <education>
        <p>Private University</p>
        <p>Masters of Business Administration</p>
        <p>Big Name State School</p>
        <p>Bachelors of Political Science</p>
    </education>
    <experience>
        <p>Project manager for major project.
        Helped keep team on schedule and under
        budget.</p>
    </experience>
    <references>Professor Smith</references>
</resume>
```

OldXMLNode: <objective>
NewXMLNode: <resume>

FIG. 6

SYSTEM AND METHOD FOR ISSUING A MESSAGE TO A PROGRAM

BACKGROUND OF THE INVENTION

Software applications are gradually becoming more and more complex and powerful. What was once a simple text editor may now be a complex word processor with countless rich features, for example the ability to create Web pages or edit XML markup. As technology evolves, each software application provides more and more functionality to enhance a user's experience. In addition, many software applications now expose their native functionality to add-on applications through programmatic interfaces. For example, object oriented programming has enabled some software applications and their documents to be treated as objects. These objects publicly expose the functionality of the applications in the form of methods that may be called and properties that may be read or set to manipulate the applications or documents. These advancements have enabled programmers to develop third-party add-ons to automate tasks and functions formerly performed manually while interacting with the application. Many such add-on applications are developed in simple programming languages, such as the Visual Basic for Applications (VBA) language. These add-ons can work by calling the application's methods and properties to achieve various goals and customize the application's core functionality for a custom environment.

In addition to being able to make calls from the custom code of the add-on to the core application, there is need for the custom code to be written in such a way that it actually responds to (as opposed to "initiates") calls from the application when something happens in the application itself. For example, one could want to write custom code for a word processing application, that reacts in some special way to the user's keystrokes received by the application and perhaps blocks some of them if the user is editing an area where only some types of letters are allowed. In such cases, there is need for a way for the programmer to let the application know that there is special custom code that the application should run when a given type of event occurs. Once the custom code is registered with the application, the code can now "react" in useful ways to specific events occurring within the core application, thereby extending the application's core functionality.

SUMMARY OF THE INVENTION

The present invention is directed at a mechanism for issuing an event notification message, from one fragment of code to another (which may not be part of the original code of the program but rather added by a third-party solution vendor to extend the original program's functionality). The notification message is of a specific type that indicates which of the possible events actually occurred. For example, the notification message could be triggered by some special state that the program has entered. The event notification message could in such a case include parameters describing what the old state was, what the new state is, and a description of the reason that caused the program to enter this state. More specifically, in an application configured to edit documents created with the eXtensible Markup Language XML, the occurrence of an XML-related change of state as a result of a user-initiated action causes the event notification message to be issued.

The XML-related state change that is reported by the event could be a change in the XML-based context of the user's insertion point in a word processing application. It could be triggered by for example the user moving the insertion point out of one XML element and into another. Or it could be triggered when the user inserts a new XML element around the selection. Or it could be triggered when the user deletes the XML element that currently surrounds the user's insertion point. In this way, a single event notification message can be used to indicate this kind of state change regardless of which of the three different user actions caused the state change while editing an XML document. It is useful for the add-on programmer to be able to write code responding to this kind of event for example in order to provide the user with context sensitive feedback, depending on where in the XML structure the user is currently editing content. For example, when the user starts editing the contents of a <city> XML element, the custom add-on could automatically suggest a list of frequently used cities to the user. In one aspect, the invention is directed at a data structure for notifying a program of the occurrence of an XML-related action in another program (or another part of the same program). The data structure includes an identifier indicating that an XML-related state change has occurred. The data structure also includes a plurality of parameters. One parameter is used to identify a first XML node affected by the state change, and another parameter is used to identify a second XML node affected by the state change (if the state change involves more than one XML node). A third parameter is used to identify which of a plurality of reasons is responsible for the state change. The type of state change that is the subject of this invention is a change in the XML context of the user's insertion point. The possible reasons for why the state change occurred are an XML related move action, an XML-related insert action, or an XML-related delete action. Another parameter is used to identify a particular selection of content affected by the XML-related state change.

In another aspect, the invention is directed at a pair of executable programs (running within the same process or within two separate processes), where a first program is designed to enable editing a document that includes XML markup. The first program is also designed to issue a single event notification in response to state change occurring while editing the document as a result of a user action affecting the XML context of the user selection. The reason for the event affecting the XML context is identified as one of a plurality of types of XML-related actions, such as an XML-related move action, and XML-related insert action, or an XML-related delete action. A second program is designed to receive the single event notification and to handle the single event notification with an event handler. The event handler includes computer-executable instructions for responding to the types of actions in some appropriate way.

In yet another aspect, the invention is directed at either a program for issuing or a program for receiving an event notification message, where the event notification message includes parameters. The event notification message itself indicates that an XML-related state change has occurred. A first parameter of the event notification message identifies a first XML node associated with the XML-related state change, a second parameter of the event notification message identifies a second XML node associated with the XML-related state change, a third parameter of the event notification message identifies one of a plurality of types of actions responsible for the state change, and a fourth parameter of the event notification message identifies an affected selection of an XML document.

BRIEF DESCRIPTION OF THE DRAWINGS

FIG. 4 is a graphical representation of what a display may look like presented by a software application allowing an XML document to be edited, in accordance with one embodiment of the invention.

FIG. 5 is a graphical representation of what another display may look like presented by the software application allowing the XML document to be further edited, in accordance with one embodiment of the invention.

FIG. 6 is a graphical representation of what still another display may look like presented by the software application allowing the XML document to be edited further still, in accordance with one embodiment of the invention.

ILLUSTRATIVE COMPUTING ENVIRONMENT OF THE INVENTION

Figure 1:
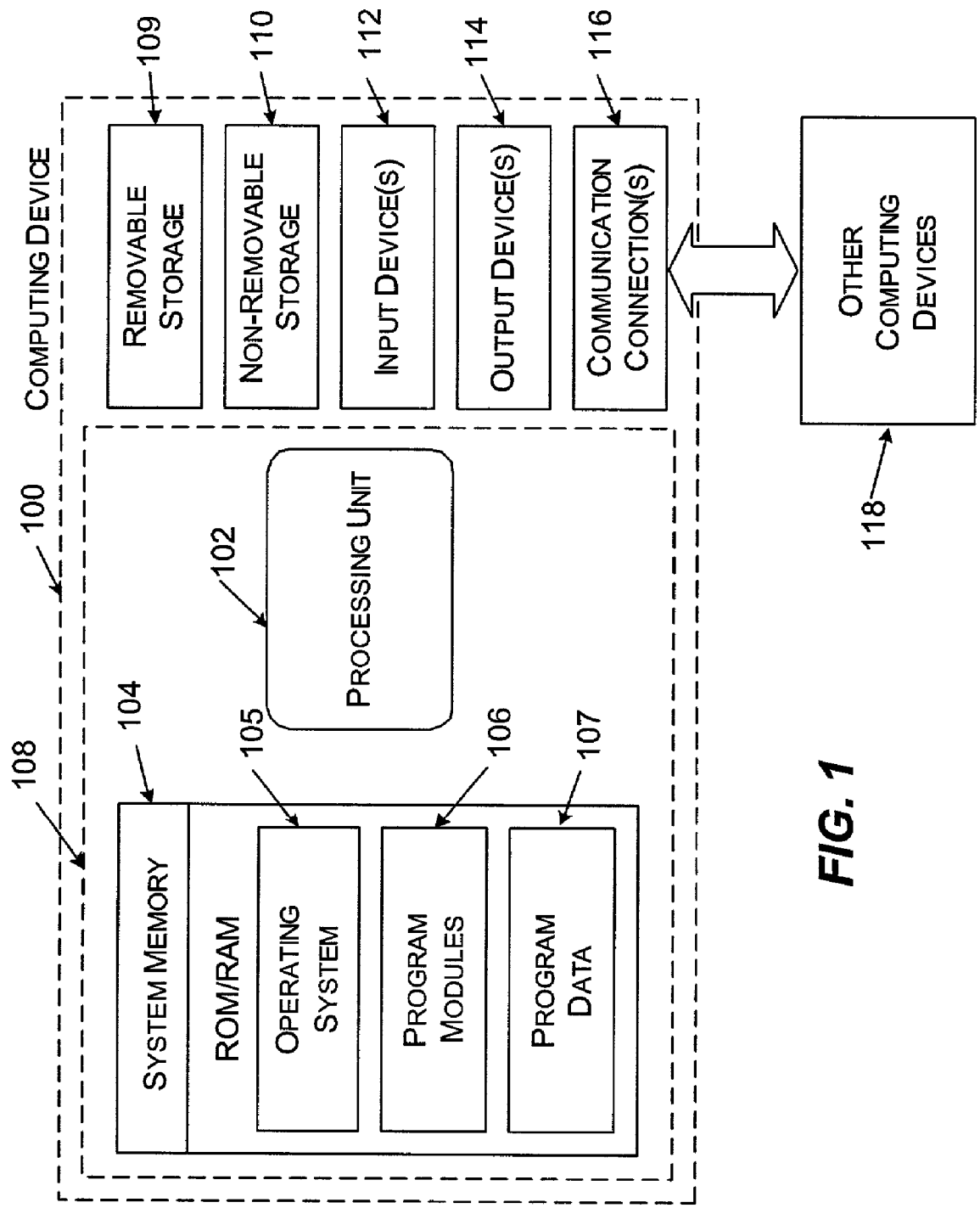
FIG. 1 is a functional block diagram of a computing environment in which implementations of the present invention may be embodied.

FIG. 1 illustrates an exemplary computing device that may be included in various forms in systems implementing the invention. In a very basic configuration, computing device 100 typically includes at least one processing unit 102 and system memory 104. Processing unit 102 includes existing physical processors, those in design, multiple processors acting together, virtual processors, and any other device or software program capable of interpreting binary executable instructions. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

DETAILED DESCRIPTION OF EMBODIMENTS OF THE INVENTION

The invention enables a software application, such as a word processor, to issue a single type of message, including parameters that refine the message, to notify another application of the occurrence of an state change, even if the state change could be caused by different user actions. More specifically, a software application that allows the editing of eXtensible Markup Language (XML) documents exposes certain functionality to other software applications. This functionality may be related to editing particular markup tags or content. Developers of add-ons to the software application may rely on being informed of certain markup-editing actions. To that end, the software application exposes notifications of these actions. In accordance with the invention, the software application is configured to issue a notification of more than one action by issuing a single "event" message. In one implementation, the single event message may be operative to indicate the state change resulting from the occurrence of one of three separate actions. First, the single event may be issued in response to an element being deleted that a current selection was inside. Second, the single event may be issued in response to an element being inserted around the current selection. Third, the single event may be issued in response to the current selection changing from one location to another. Regardless of what the cause of the state change, the event that fires is the same, but it includes the cause for the state change among its parameters.

Figure 2:
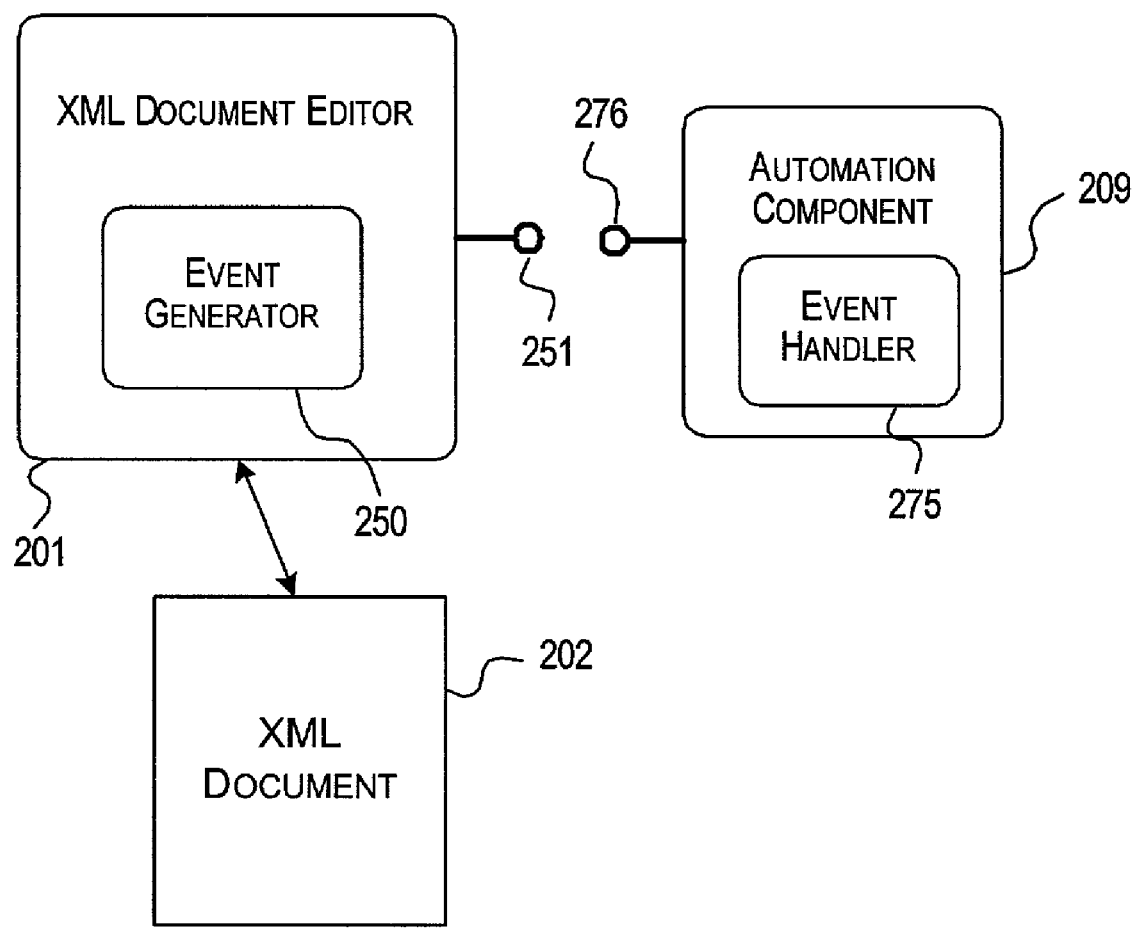
FIG. 2 is a functional block diagram overview of software applications that expose and use a public interface, in accordance with one embodiment of the present invention.

FIG. 2 is a functional block diagram of a software application implementing one embodiment of the present invention to issue a single event message to another software application or program in response to the occurrence of one of a plurality of different actions. An XML document editor 201 is a software application that enables a user to create and edit XML documents, such as XML document 202, in a freestyle editing environment. The XML document editor 201 may be a word processor specially programmed to enable XML creation and editing. Although described here in the context of a word processor, it will be appreciated that the invention is not limited to word processors, but in fact has equal applicability to any application capable of manipulating XML (or the like) documents, such as a spreadsheet application, a forms editor, a desktop publishing package, an e-mail editor, a code editing tool, or any other tool where user interaction with the application might result (even if unknown to the user) in an XML document being changed, just to name a few.

The XML document 202 is a file that includes XML elements and content. The XML document 202 may include elements inserted by the XML document editor 201 that are associated with formatting or the like. In addition, the XML document 202 may include elements that are inserted manually by the user and which represent arbitrary elements of the user's choosing and design. In either case, the XML document editor 201 allows the user to edit the XML document 202, including inserting, modifying, and deleting elements and their content.

An event generator 250 associated with the XML document editor 201 is programmed to listen for the occurrence of certain changes of state in the document as a result of certain actions, and to issue a notification of those state changes if they occur. The notification takes the form of a public interface 251 that exposes certain functionality of the XML document editor 201.

Turning briefly away from the public interface 251, another program, such as an automation component 209, is also included and is programmed to add some supplemental or automated functionality to the XML document editor 201. In other words, the automation component 209 is a software application that may be developed to provide a user of the XML document editor 201 with some automation of tasks already present in the XML document editor 201. One common example might be a "macro" application that reduces several otherwise-manual steps to perform some activity, such as formatting a document in accordance with a company standard, into a single button click or the like. Alternatively, the automation component 209 may add supplemental functionality to the XML document editor 201, such as enabling a user to invoke some outside process for publishing the document to the Web, or the like. In any case, the automation component 209 includes code, such as event handler 275, that responds to the occurrence of some activity in the XML document editing environment. In particular, the automation component 209 is programmed to automate or add supplemental functionality to XML-related editing actions. More specifically, in accordance with the invention, the event handler 275 is programmed to respond to the occurrence of particular actions directly related to editing the XML document 202.

Returning now to the interface exposed by the XML document editor 201, the inventors have determined that there are three categories of actions that result in an XML context state change that is of interest to XML-related add-on software applications, such as the automation component 209. These categories include: (1) deleting an XML element surrounding a current selection point, (2) inserting a new XML element around a selection point, and (3) moving the selection point from one location to another. In addition, the case of moving the selection point from one location to another encompasses three distinct XML-relevant situations: (1) moving the selection point from within one XML element to within another XML element, (2) moving the selection point from within one XML element to content that is not within an XML element, and (3) moving the selection point to within an XML element from content that is not within an XML element.

In the past, each of these categories of actions would have justified a separate notification, requiring the developer of the automation component 209 to learn and handle three different events. However, the inventors have determined that these particular three categories of actions are commonly handled by similar code and for similar purposes. Accordingly, a single event has been developed to notify add-on software applications of a state change in the document resulting from each of these three actions. In this way, a single event handler, such as event handler 275, may be implemented to take advantage of the functionality exposed by the XML document editor 201. It should be noted that in this case, the term "functionality" means functionality related to the experience of editing XML-related content or elements.

Figure 3:
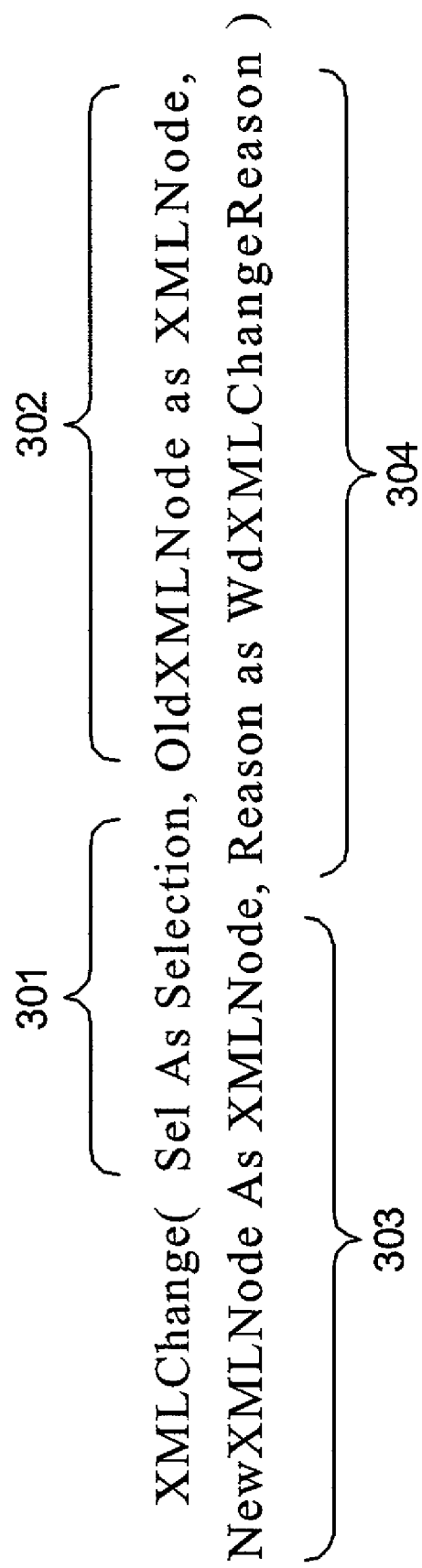
FIG. 3 is a logical representation of one implementation of an event notification message that may be employed in one embodiment of the present invention.

With a single event, the automation component 209 can include a single event handler 275 programmed to respond to the XML context state changes caused by each of the three categories of actions. This design simplifies the job of developing the automation component 209 without sacrificing the flexibility of handling different events. In one specific implementation, the event exposed by the public interface 251 could take substantially the form illustrated in FIG. 3, and reproduced here:

XMLChange(Sel As Selection, OldXMLNode As XMLNode, NewXMLNode As XMLNode, Reason As WdXMLChangeReason)

where each term in the instruction has the following meaning. The term "XMLChange" refers to the name of the event being exposed, the "Sel" parameter 301 corresponds to an object representing a current selection point or selected content within an XML document being edited, the "OldXMLNode" parameter 302 corresponds to an object representing an XML element in which the selection existed prior to completion of the pending action, the "NewXMLNode" parameter 303 corresponds to an object representing an XML element in which the selection will exist after completion of the pending action, and the "Reason" parameter 304 corresponds to an identifier of the category of the particular pending action that results in this XML context state change. The Reason parameter is used to identify one of the three categories of actions described above. Accordingly, when this message is issued by the XML document editor 201, the Reason parameter passed is one of three that defines which of the three types of actions has occurred.

In order to take advantage of the event exposed by the XML document editor 201, the event handler 275 includes a declaration that makes the event handler 275 aware of the event, and then the code to execute in response to each of the three categories of actions. What follows is pseudo code that can be used in one specific implementation to handle the event described above:

Public WithEvents oWordProc As WordProc.Application
Private Sub oWordProc_XMLChange(Sel As Selection, OldXMLNode As XMLNode, NewXMLNode As XMLNode, Reason As WdXMLChangeReason)
  Select Case Reason
    Case wdXMLChangeReasonInsert
      Code to execute in response to an XML insertion
    Case wdXMLChangeReasonDelete
      Code to execute in response to an XML deletion
    Case wdXMLChangeReasonMove
      Code to execute in response to moving the selection point
  End Select
End Sub Those skilled in the art will appreciate that the above pseudo code first creates an object "oWordProc" that is of "WordProc.Application" type, where objects of type WordProc.Application are basically instantiations of the functionality made available by the software application named "WordProc." In this instance, the WordProc application corresponds to the XML document editor 201 so that the oWordProc object corresponds to an instance of the XML document editor 201. Including the "WithEvents" statement makes the oWordProc object aware of events generated by the XML document editor 201. To that end, the subroutine named "oWordProc_XMLChange" includes code to handle the XMLChange event described above. The parameters of the handler code and the message are the same.

In this particular instance, a Select/Case construct has been used to handle each of the three reasons that the event may be raised. For instance, the statement "Case wdXMLChangeReasonInsert" may be used to handle an event fired for the reason that an XML element has been inserted around a selection. The statement "Case wdXMLChangeReasonDelete" may be used to handle an event fired for the reason that an XML element surrounding the selection has been deleted. And the statement "Case wdXMLChangeReasonMove" may be used to handle an event fired for the reason that the selection point has moved in some way XML-relevant way. Each of these three cases will now be described with reference to FIGS. 4 through 6.

FIG. 4 is a graphical representation of what a display 410 may look like presented by the XML document editor 201 while allowing the XML document 202 to be edited. As illustrated, the XML document 202 may be a resume document with several portions wrapped by XML elements. For instance, the name "John Doe" is included within a <name> element 405, which is in turn included within a <resume> element 407. An insertion point is shown at an original location 415 corresponding to content within a <p> element 430.

While editing, a user may perform many actions on the XML document 202, including moving the insertion point. For instance, during editing the insertion point may be moved from the original location 415 to a new location 425 within the stream of text "Professor Smith." Note that this stream of text, as illustrated, is not contained within any current XML element. Accordingly, based on this action and its surrounding circumstances, an event will be raised indicating that the insertion point was moved from one XML element to content not within any XML element. In this case, a message closely resembling the event illustrated above may be issued with parameters as will now be defined.

The Sel parameter may include an object that contains a current selection. In the described example, the current selection is related to the original location 415 of the insertion point. In other words, the entire content of the <p> element may be passed in the Selection object or some subset of that content if less than all the content is selected. Since the insertion point moved from within the XML element <p>, the OldXMLNode corresponds to the particular <p> element 430 within which the original location 415 existed. Similarly, the NewXMLNode corresponds to the XML element to which the insertion point has moved, which in this case is NULL because there is no XML element surrounding the new location 425. Finally, the Reason parameter includes an indicator that an XML-related Move action has taken place.

It should be noted that the insertion point could have been moved in the other direction (e.g., from the new location 425 to the original location 415). In that case, the XML context change event would still have been raised, although the OldXMLNode would have been NULL, and the NewXMLNode would have been the <p> element 430. The other parameters would have been as just described.

It should be appreciated by those skilled in the art, that the creators of the word processing application are free to define which types of XML elements cause the event to fire or not. For example, application creators could decide that Move, Insert or Delete actions involving elements of some special namespace they select do not cause the event to fire, but they do if the elements are from another namespace. More specifically, application creators could decide that elements from the namespace representing the native XML schema of a word processing application are completely invisible to the state change detector that causes the event to fire and only elements from the non-native namespaces are "watched" by the event generator 250.

FIG. 5 is another display of the XML document 202 after further edits have been performed. First, the user may insert a new XML element around the "Professor Smith" text, thereby moving it into the <resume> element 407. Based on these circumstances, an XML-related insert event is raised by the XML document editor 201. Accordingly, the Sel parameter of the event includes a Selection object representing the content of the new XML element 510, the text "Professor Smith." Since that text was not included within an XML element prior to the insert action, the OldXMLNode is NULL. The NewXMLNode identifies the new element, the <references> element 510. Finally, the reason parameter includes an identifier corresponding to an insert event.

In this example, after the user inserts the <references> element 510, the insertion point is moved from the <references> element 510 to the <objective> element 512, thereby causing another move event to be raised. However, unlike the move event described above, the current move event corresponds to moving the insertion point from one XML element (the <references> element 510) to another XML element (the <objective> element 512). In this case, the Sel parameter of the event corresponds to the content of the <references> element 510, the text "Professor Smith." The OldXMLNode parameter identifies the <references> element 510, and the NewXMLNode parameter identifies the <objective> element 512. And finally, the Reason parameter identifies the type of event as an XML-related move event.

FIG. 6 is yet another display of the XML document 202 after further edits have been performed. In this situation, the user has deleted the <objective> element from around the "Rewarding employment" text 610, causing an XML-related delete event to be raised. In similar fashion to the events described above, the delete event includes a Sel parameter that identifies the "Rewarding employment" text 610 as the current selection, the <objective> element 512 (FIG. 5) as the OldXMLNode, and the <resume> element 407 as the NewXMLNode. Finally, the Reason parameter includes an indication that an XML-related delete action has been performed.

In summary, the invention enables overloading a single event notification to indicate the occurrence of a state change resulting from plural XML-related actions in an XML editing environment. The single event notification for plural actions simplifies the task of developing add-on software applications that take advantage of functionality exposed by the XML editing environment.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable storage medium encoded with instructions for issuing a notification from a first program to a second program, the instructions comprising:

a notification issuer configured as part of the first program to issue an event notification in response to determining that an event occurred, the event being associated with action performed by the first program on an Extensible Markup Language (XML) document, irrespective of a type of the action, wherein the event notification comprises a data structure, the data structure comprising:

an identifier field indicating that the data structure represents an occurrence of the action performed on the XML document by the first program, a first parameter field identifying a current selection within the XML document, a second parameter field identifying a first XML node associated with the event and contained within an XML namespace not native to the first program, wherein the first XML node corresponds to a first associated node within which the current selection existed when performance of the action began, a third parameter field identifying a second XML node associated with the event, wherein the second XML node corresponds to a second associated node within which the current selection will exist after the action has been performed, and a fourth parameter field identifying a type of the event that occurred, wherein the type of the event is selected from one of a plurality of event types; and a single event handler, associated with the second program, configured to receive the event notification irrespective of which of a plurality of actions caused the event notification to be sent, wherein the first parameter, the second parameter, the third parameter, and the fourth parameter are included in the event notification received by the second program in response to a state change caused by at least one of the plurality of actions and used to provide supplemental functionality to the first program when the at least one of the plurality of actions occurs.

2. The system of claim 1, wherein the plurality of event types are selected from a group comprising an XML-related move action, an XML-related insert action, and an XML-related delete action.

3. The system of claim 2, wherein the XML-related move action comprises moving the current selection from the first XML node to the second XML node.

4. The system of claim 2, wherein the XML-related move action comprises moving the current selection from content that does not have an associated XML node to the second XML node.

5. The system of claim 2, wherein the XML-related move action comprises moving the current selection from the first XML node to content that does not have an associated XML node.

6. The system of claim 2, wherein the XML-related insert action comprises causing the current selection to be within the second XML node.

7. The system of claim 2, wherein the XML-related delete action comprises deleting the first XML node such that the current selection that was within the first XML node becomes within the second XML node.

8. The system of claim 1, wherein the data structure is configured to be passed from the first program to the second program when performance of the action is initiated, and wherein the first parameter, the second parameter, the third parameter, and the fourth parameter fields are configured to elicit from the second program another action responsive to the single event.

9. A computer-readable storage medium having computer-executable components comprising:

a first program for editing a document that includes a plurality of Extensible Markup Language (XML) nodes, wherein at least a portion of the plurality of XML nodes include content;

a notification issuer configured as part of the first program to issue a single event notification in response to determining that an event occurred, the event being associated with an action performed by the first program on a corresponding node containing an XML namespace not native to the first program, wherein the single event notification is irrespective of a type of the action and comprises a plurality of parameters, the plurality of parameters comprising:

a first parameter identifying the first XML node associated with the XML-related action, a second parameter identifying a second XML node associated with the XML-related action, and a third parameter identifying one of a plurality of action types that corresponds to the XML-related action; and a second program configured to receive the single event notification and to handle the single event notification with an event handler, the event handler including computer-executable instructions for receiving the single event notification at the event handler regardless of which of a plurality of action types caused the single event notification to be issued and responding to each of the plurality of action types, wherein the second program uses the single event notification to provide supplemental functionality to the first program.

10. The computer-readable storage medium of claim 9, wherein the event handler further includes computer-executable instructions for responding to each of the plurality of action types, and wherein the response includes causing a third program to perform a further action that is different from the performed action.

11. The computer-readable storage medium of claim 9, wherein the plurality of action types comprise an XML-related move action corresponding to moving a current selection from content that does not have an associated XML node to within an XML node.

12. The computer-readable storage medium of claim 9, wherein the plurality of action types comprise an XML-related move action corresponding to moving a current selection from within an XML node to content that does not have an associated XML node.

13. The computer-readable storage medium of claim 9, wherein the plurality of action types comprise an XML-related move action corresponding to moving a current selection from within one XML node to within another XML node.

14. The computer-readable storage medium of claim 9, wherein the plurality of action types comprise an XML-related insert action corresponding to inserting an XML node around content within the document.

15. The computer-readable storage medium of claim 9, wherein the plurality of action types comprise an XML-related delete action corresponding to deleting an XML node from the document.

16. The computer-readable storage medium of claim 9, wherein the plurality of action types comprise an XML-related move action, an XML-related insert action, and an XML-related move action.

17. A computer-readable storage medium which stores a set of instructions which when executed performs a method for issuing a message from a first program to a second program, the method executed by the set of instructions comprising:

issuing by a notification issuer configured as part of the first program, from the first program to the second program, an event notification in response to determining that an event associated with a single Extensible Markup Language (XML) related action occurred on a first XML node contained within an XML namespace not native to the first program related to the first program, the event notification being irrespective of a type of the action and having a plurality of parameters, the plurality of parameters comprising:

a first parameter identifying the first XML node associated with the XML-related action, a second parameter identifying a second XML node associated with the XML-related action, and a third parameter identifying one of a plurality of action types that corresponds to the XML-related action;

wherein the second program uses the event notification to provide supplemental functionality to the first program; and receiving the event notification comprising the plurality of parameters, by the second program from the first program, wherein the second program is configured to receive the event notification by a single event handler irrespective of which of the plurality of action types caused the event message to be sent and respond to the received event notification by providing supplemental functionality to the first program.

18. A method for issuing an event notification from a first program to a second program, the method comprising:

determining, in the first program, an occurrence of an action for editing a document, the document including Extensible Markup Language (XML) nodes contained in a plurality of XML namespaces;

selecting a type of action from a plurality of action types, the selected type of action correlated to the determined action;

in response to the occurred action, irrespective of the type of action, issuing an event notification, by a notification issuer configured as part of the first program, from the first program to a second program, the event notification including a first parameter field identifying a first XML node contained within one of the plurality of XML namespaces not native to the first program and associated with the action, a second parameter field identifying a second XML node associated with the action, and a third parameter field identifying the selected type of the action and used by the second program to provide supplemental functionality to the first program; and receiving, by the second program, the event notification, wherein the second program comprises a single event handler configured to receive the event notification irrespective of which of the plurality of action types caused the event notification to be issued.

19. The method of claim 18, wherein the selected type of action comprises a delete action type if the determined action includes a deletion of at least one of XML nodes from the document.

20. The method of claim 19, wherein the selected type of action comprises an XML-related insert action type if the determined action includes an insertion of at least one of XML nodes around content within the document.

21. The method of claim 20, wherein the selected type of action comprises an XML-related move action type if the determined action includes at least one from a set of: movement of a current selection from content that does not have an associated XML node to within at least one of XML nodes, movement of the current selection from within the at least one of XML nodes to content that does not have an associated XML node, and movement of the current selection from within a first one of the XML nodes to within a second one of the XML nodes.

22. The method of claim 21, wherein the second program includes a 'macro' application that provides automated functionality in the first program.

23. The method of claim 18, wherein the supplemental functionality includes providing a user interface to invoke a process external to the first program.

* * * * *

UNITED STATES PATENT AND TRADEMARK OFFICE
CERTIFICATE OF CORRECTION

| | | |
|---|---|---|
| PATENT NO. | : 7,716,676 B2 | Page 1 of 1 |
| APPLICATION NO. | : 10/183317 | |
| DATED | : May 11, 2010 | |
| INVENTOR(S) | : Marcin Sawicki et al. | |

It is certified that error appears in the above-identified patent and that said Letters Patent is hereby corrected as shown below:

Title Page;
In page 5, in field (56), under "Other Publications" column 1, line 11, above "European Examination" insert -- European Examination Report dated Mar. 4, 2006 cited in Ep Application No. 02 014 717.9-1527. --.

In column 9, line 32, in Claim 2, after "comprising" insert -- : --.

Signed and Sealed this
Eighth Day of February, 2011

David J. Kappos
*Director of the United States Patent and Trademark Office*